United States Patent
Kanamoto

(10) Patent No.: US 10,061,544 B2
(45) Date of Patent: Aug. 28, 2018

(54) PRINTING APPARATUS CAPABLE OF RECEIVING A PLURALITY OF JOBS AND SELECTING SHEET INFORMATION BASED ON USER INFORMATION

(71) Applicant: CANON KABUSHIKI KAISHA, Tokyo (JP)

(72) Inventor: Yoshiji Kanamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/963,145

(22) Filed: Dec. 8, 2015

(65) Prior Publication Data
US 2016/0179439 A1 Jun. 23, 2016

(30) Foreign Application Priority Data
Dec. 19, 2014 (JP) .................................. 2014-257829

(51) Int. Cl.
*G06F 3/12* (2006.01)
*G06K 15/02* (2006.01)
*G06K 15/00* (2006.01)

(52) U.S. Cl.
CPC .......... *G06F 3/1205* (2013.01); *G06F 3/1255* (2013.01); *G06F 3/1267* (2013.01);
(Continued)

(58) Field of Classification Search
None
See application file for complete search history.

(56) References Cited

U.S. PATENT DOCUMENTS 5,081,595 A * 1/1992 Moreno ................. G03G 15/50
358/1.12
5,835,820 A * 11/1998 Martin .................... B41J 11/003
399/38
(Continued)

FOREIGN PATENT DOCUMENTS

JP 2011-62970 3/2011
JP 2011062970 A * 3/2011

OTHER PUBLICATIONS

Machine translation of Japanese Patent Publication No. 2011-062970 to Yamamoto et al., published on Mar. 31, 2011.*

*Primary Examiner* — Paul F Payer
(74) *Attorney, Agent, or Firm* — Fitzpatrick, Cella, Harper & Scinto

(57) ABSTRACT

A printing apparatus includes a storage configured to store sheet information and user identification information in association with each other, wherein the sheet information includes attribution information, and a processor that executes a set of instructions to cause the printing apparatus to function as a receiving unit configured to receive a print job including attribute information of a sheet and user identification information, a selecting unit configured to select, from the storage, sheet information based on the attribute information and the user identification information, which are included in the print job received by the receiving unit, and a register unit configured to register, with the storage, sheet information generated from the attribute information included in the received print job in association with the user identification information included in the received print job, in a case in which the sheet information including the attribute information included in the received print job is not stored in the storage in association with the user identification information included in the received print job.

16 Claims, 24 Drawing Sheets

(52) U.S. Cl.
  CPC ....... *G06F 3/1282* (2013.01); *G06K 15/1809* (2013.01); *G06K 15/002* (2013.01); *G06K 15/1823* (2013.01); *G06K 15/4065* (2013.01)

(56) References Cited

U.S. PATENT DOCUMENTS

| | | | | |
|---|---|---|---|---|
| 7,227,659 | B2* | 6/2007 | Nakata | G06K 15/00 358/1.14 |
| 7,239,409 | B2* | 7/2007 | Parry | G06F 3/1267 358/1.13 |
| 7,355,733 | B2* | 4/2008 | Sommer | H04N 1/00408 358/1.14 |
| 8,970,894 | B2* | 3/2015 | Tokura | G06F 3/1205 358/1.13 |
| 9,058,555 | B2 | 6/2015 | Kanamoto et al. | |
| 9,073,726 | B2 | 7/2015 | Kanamoto | |
| 2011/0063682 | A1 | 3/2011 | Kanamoto | |
| 2013/0329256 | A1* | 12/2013 | Fukuda | G06K 15/4065 358/1.15 |
| 2015/0254040 | A1 | 9/2015 | Kanamoto | |
| 2015/0262041 | A1 | 9/2015 | Kanamoto et al. | |
| 2015/0350469 | A1 | 12/2015 | Kanamoto | |

* cited by examiner

F I G. 6

```
<?xml version="1.0" encoding="UTF-8"?>
<JDF ID="ID01" JobPartID="JobPartID01" Type="Combined" Activation="Active" Status="Ready"
Types="LayoutPreparation Imposition Interpreting Rendering DigitalPrinting"
Version="1.2" Category="DigitalPrinting" MaxVersion="1.2" xmlns="http://www.CIP4.org/JDFSchema_1_1"
JobID="JobID01" DescriptiveName="Sample 01">

<ResourcePool>
   <RunList Class="Parameter" ID="IDRL" Status="Available" PartIDKeys="Run"/>
   <LayoutPreparationParams Class="Parameter" ID="IDLPP" Status="Available" Sides="TwoSidedFlipX"/>
   <InterpretingParams Class="Parameter" ID="IDIP" Status="Available"/>
   <RenderingParams Class="Parameter" ID="IDRP" Status="Available" />
   <DigitalPrintingParams Class="Parameter" ID="IDDPP" Status="Available" Collate="SheetSetAndJob"
      PartIDKeys="RunIndex">
      <MediaRef rRef="MED_000"/>
      <DigitalPrintinigParams RunIndex="2~3">
         <MediaRef rRef="MED_001"/>
      </DigitalPrintingParams>
   </DigitalPrintingParams>
   <Component Class="Quantity" ID="IDC" ComponentType="FinalProduct" Status="Unavailable"/>
601
   <Media ID="MED_000" Class="Consumable" Status="Available" Dimension="842 595" Weight="100">
   </Media>
                                                                        602              603

</ResourcePool>

<ResourceLinkPool>
   <LayoutPreparationParamsLink rRef="IDLPP" Usage="Input" CombinedProcessIndex="0"/>
   <RunListLink rRef="IDRL" Usage="Input" CombinedProcessIndex="0 1"/>
   <InterpretingParamsLink rRef="IDIP" Usage="Input" CombinedProcessIndex="2"/>
   <RenderingParamsLink rRef="IDRP" Usage="Input" CombinedProcessIndex="3"/>
   <DigitalPrintingParamsLink rRef="IDDPP" Usage="Input" CombinedProcessIndex="4"/>
   <ComponentLink rRef="IDC" Usage="Output" CombinedProcessIndex="4"/>
</ResourceLinkPool>
</JDF>
```

| | 706 | 707 | 708 | 709 | 710 | 711 | 712 |
|---|---|---|---|---|---|---|---|
| | ID | NAME | GRAMMAGE | SURFACE PROPERTY | SHAPE | COLOR | SIZE |
| 701 | 1 | Media1 | 85 | NORMAL PAPER | NORMAL | RED | A4 |
| 702 | 2 | Media2 | 100 | NORMAL PAPER | NORMAL | WHITE | A4 |
| 703 | 3 | Media3 | 120 | COATED PAPER | NORMAL | WHITE | ANY |
| 704 | 4 | Media4 | 80 | COATED PAPER | NORMAL | RED | ANY |
| 705 | 5 | Media5 | 125 | NORMAL PAPER | PUNCH PAPER | GREEN | A3 |

FIG. 8

```
<?xml version="1.0" encoding="UTF-8"?>
<JDF ID="ID01" JobPartID="JobPartID01" Type="Combined" Activation="Active" Status="Ready"
Types="LayoutPreparation Imposition Interpreting Rendering DigitalPrinting"
Version="1.2" Category="DigitalPrinting" MaxVersion="1.2" xmlns="http://www.CIP4.org/JDFSchema_1_1"
JobID="JobID02" DescriptiveName="Sample 02">

<ResourcePool>
   <RunList Class="Parameter" ID="IDRL" Status="Available" PartIDKeys="Run"/>
   <LayoutPreparationParams Class="Parameter" ID="IDLPP" Status="Available" Sides="TwoSidedFlipX"/>
   <InterpretingParams Class="Parameter" ID="IDIP" Status="Available"/>
   <RenderingParams Class="Parameter" ID="IDRP" Status="Available" />
   <DigitalPrintingParams Class="Parameter" ID="IDDPP" Status="Available" Collate="SheetSetAndJob"
      PartIDKeys="RunIndex">
      <MediaRef rRef="MED_000"/>
      <DigitalPrintinigParams RunIndex="2~3">
         <MediaRef rRef="MED_001"/>
      </DigitalPrintingParams>
   </DigitalPrintingParams>
   <Component Class="Quantity" ID="IDC" ComponentType="FinalProduct" Status="Unavailable"/>
801
   <Media ID="MED_000" Class="Consumable" Status="Available" Dimension="842 595"
      MediaColorName="White">
   </Media>                                                   802
              803
</ResourcePool>

<ResourceLinkPool>
   <LayoutPreparationParamsLink rRef="IDLPP" Usage="Input" CombinedProcessIndex="0"/>
   <RunListLink rRef="IDRL" Usage="Input" CombinedProcessIndex="0 1"/>
   <InterpretingParamsLink rRef="IDIP" Usage="Input" CombinedProcessIndex="2"/>
   <RenderingParamsLink rRef="IDRP" Usage="Input" CombinedProcessIndex="3"/>
   <DigitalPrintingParamsLink rRef="IDDPP" Usage="Input" CombinedProcessIndex="4"/>
   <ComponentLink rRef="IDC" Usage="Output" CombinedProcessIndex="4"/>
</ResourceLinkPool>
</JDF>
```

| | 706 | 707 | 708 | 709 | 710 | 711 | 712 |
|---|---|---|---|---|---|---|---|
| | ID | NAME | GRAMMAGE | SURFACE PROPERTY | SHAPE | COLOR | SIZE |
| 701 | 1 | Media1 | 85 | NORMAL PAPER | NORMAL | RED | A4 |
| 702 | 2 | Media2 | 120 | NORMAL PAPER | NORMAL | RED | A4 |
| 703 | 3 | Media3 | 120 | COATED PAPER | NORMAL | WHITE | ANY |
| 704 | 4 | Media4 | 80 | COATED PAPER | NORMAL | RED | ANY |
| 705 | 5 | Media5 | 125 | NORMAL PAPER | PUNCH PAPER | GREEN | A3 |

FIG. 10

| | ID | NAME | GRAMMAGE | SURFACE PROPERTY | SHAPE | COLOR | SIZE | OWNER |
|---|---|---|---|---|---|---|---|---|
| 1001 | 1 | Media1 | 85 | NORMAL PAPER | NORMAL | RED | A4 | SHARED |
| 1002 | 2 | Media2 | 100 | NORMAL PAPER | NORMAL | WHITE | A4 | OPERATOR A |
| 1003 | 3 | Media3 | 120 | COATED PAPER | NORMAL | WHITE | ANY | OPERATOR A |
| 1004 | 4 | Media4 | 80 | COATED PAPER | NORMAL | RED | ANY | OPERATOR B |
| 1005 | 5 | Media5 | 125 | NORMAL PAPER | PUNCH PAPER | GREEN | A3 | SHARED |

Column refs: 1006 1007 1008 1009 1010 1011 1012 1013

FIG. 11

| | 1006 | 1007 | 1008 | 1009 | 1010 | 1011 | 1012 | 1013 |
|---|---|---|---|---|---|---|---|---|
| | ID | NAME | GRAMMAGE | SURFACE PROPERTY | SHAPE | COLOR | SIZE | OWNER |
| 1001 | 1 | Media1 | 85 | NORMAL PAPER | NORMAL | RED | A4 | SHARED |
| 1002 | 2 | Media2 | 100 | NORMAL PAPER | NORMAL | WHITE | A4 | OPERATOR A |
| 1003 | 3 | Media3 | 120 | COATED PAPER | NORMAL | WHITE | ANY | OPERATOR A |
| 1004 | 4 | Media4 | 80 | COATED PAPER | NORMAL | RED | ANY | OPERATOR B |
| 1005 | 5 | Media5 | 125 | NORMAL PAPER | PUNCH PAPER | GREEN | A3 | SHARED |
| 1014 | 6 | Media6 | Default | Default | Default | WHITE | A4 | OPERATOR B |

FIG. 12

| | ID 1006 | NAME 1007 | GRAMMAGE 1008 | SURFACE PROPERTY 1009 | SHAPE 1010 | COLOR 1011 | SIZE 1012 | OWNER 1013 |
|---|---|---|---|---|---|---|---|---|
| 1001 | 1 | Media1 | 85 | NORMAL PAPER | NORMAL | RED | A4 | SHARED |
| 1002 | 2 | Media2 | 100 | NORMAL PAPER | NORMAL | RED | A4 | OPERATOR A |
| 1003 | 3 | Media3 | 120 | COATED PAPER | NORMAL | WHITE | ANY | OPERATOR A |
| 1004 | 4 | Media4 | 80 | COATED PAPER | NORMAL | RED | ANY | OPERATOR B |
| 1005 | 5 | Media5 | 125 | NORMAL PAPER | PUNCH PAPER | GREEN | A3 | SHARED |
| 1014 | 6 | Media6 | Default | Default | Default | WHITE | A4 | OPERATOR B |

FIG. 18

| | 1806 | 1807 | 1808 | 1809 | 1810 | 1811 | 1812 | 1813 |
|---|---|---|---|---|---|---|---|---|
| | ID | NAME | GRAMMAGE | SURFACE PROPERTY | SHAPE | COLOR | SIZE | REFERENCED STATE |
| 1801 | 1 | Media1 | 85 | NORMAL PAPER | NORMAL | RED | A4 | No |
| 1802 | 2 | Media2 | 100 | NORMAL PAPER | NORMAL | WHITE | A4 | No |
| 1803 | 3 | Media3 | 120 | COATED PAPER | NORMAL | WHITE | ANY | Yes |
| 1804 | 4 | Media4 | 80 | COATED PAPER | NORMAL | RED | ANY | Yes |
| 1805 | 5 | Media5 | 125 | NORMAL PAPER | PUNCH PAPER | GREEN | A3 | No |

FIG. 19

| | 1806 | 1807 | 1808 | 1809 | 1810 | 1811 | 1812 | 1813 |
|---|---|---|---|---|---|---|---|---|
| | ID | NAME | GRAMMAGE | SURFACE PROPERTY | SHAPE | COLOR | SIZE | REFERENCED STATE |
| 1801 | 1 | Media1 | 85 | NORMAL PAPER | NORMAL | RED | A4 | No |
| 1802 | 2 | Media2 | 100 | NORMAL PAPER | NORMAL | WHITE | A4 | Yes |
| 1803 | 3 | Media3 | 120 | COATED PAPER | NORMAL | WHITE | ANY | Yes |
| 1804 | 4 | Media4 | 80 | COATED PAPER | NORMAL | RED | ANY | Yes |
| 1805 | 5 | Media5 | 125 | NORMAL PAPER | PUNCH PAPER | GREEN | A3 | No |

FIG. 20

| | 1806 | 1807 | 1808 | 1809 | 1810 | 1811 | 1812 | 1813 |
|---|---|---|---|---|---|---|---|---|
| | ID | NAME | GRAMMAGE | SURFACE PROPERTY | SHAPE | COLOR | SIZE | REFERENCED STATE |
| 1801 | 1 | Media1 | 85 | NORMAL PAPER | NORMAL | RED | A4 | No |
| 1802 | 2 | Media2 | 100 | NORMAL PAPER | NORMAL | WHITE | A4 | Yes |
| 1803 | 3 | Media3 | 120 | COATED PAPER | NORMAL | WHITE | ANY | Yes |
| 1804 | 4 | Media4 | 80 | COATED PAPER | NORMAL | RED | ANY | Yes |
| 1805 | 5 | Media5 | 125 | NORMAL PAPER | PUNCH PAPER | GREEN | A3 | No |
| 1814 | 6 | Media6 | 100 | NORMAL PAPER | NORMAL | WHITE | A4 | Yes |

FIG. 22

| | ID | NAME | GRAMMAGE | SURFACE PROPERTY | SHAPE | COLOR | SIZE | REFERENCED COUNT |
|---|---|---|---|---|---|---|---|---|
| 1801 | 1 | Media1 | 85 | NORMAL PAPER | NORMAL | RED | A4 | 0 |
| 1802 | 2 | Media2 | 100 | NORMAL PAPER | NORMAL | WHITE | A4 | 2 |
| 1803 | 3 | Media3 | 120 | COATED PAPER | NORMAL | WHITE | ANY | 1 |
| 1804 | 4 | Media4 | 80 | COATED PAPER | NORMAL | RED | ANY | 1 |
| 1805 | 5 | Media5 | 125 | NORMAL PAPER | PUNCH PAPER | GREEN | A3 | 0 |

Column labels: 1806 (ID), 1807 (NAME), 1808 (GRAMMAGE), 1809 (SURFACE PROPERTY), 1810 (SHAPE), 1811 (COLOR), 1812 (SIZE), 1813 (REFERENCED COUNT)

PRINTING APPARATUS CAPABLE OF RECEIVING A PLURALITY OF JOBS AND SELECTING SHEET INFORMATION BASED ON USER INFORMATION

BACKGROUND OF THE INVENTION

Field of the Invention

The present invention relates to a printing apparatus capable of accepting a plurality of jobs, a method of controlling the same, and a storage medium.

Description of the Related Art

In recent digital printers, various media types are supported. By using multiple types of media, it is possible to easily generate complex and high-value-added output material as a result. Also, digital printers directed to a POD market generally are provided with a job hold function. Job hold indicates a function of holding a plurality of print job data items in a digital printer temporarily or persistently, and selecting and printing of specific job data at a later stage. A function for selecting desired data from out of a plurality print job data items held by the job hold function is also provided. With this, an operator can select job data corresponding to desired print processing. An operator of the digital printer, at a stage at which a certain number of print job data items that he should process himself is stored by the job hold function, selects a plurality of job data items to be printing targets, and instructs print processing. In other words, it is possible to aim for optimization by performing print processing of stored print job data collectively.

Also, in a digital printer, a media mismatch determination for determining whether or not attribute information of media used in a job matches the attribute information of media registered to a feed cassette is performed when a job is registered. For example, in a media mismatch determination, if the attribute information of media used in the job is "A4 normal paper", and the attribute information of media registered to the feed cassette is "A4 normal paper", the result of the determination is "match". On the other hand, if the attribute information of the media used in the job is "A4 normal paper", for example, and the attribute information of the media registered to the feed cassette is "A4 coated paper", the result of the determination is "mismatch".

In Japanese Patent Laid-Open No. 2011-62970, reading identification information that a storage medium is provided with, and determining availability of the storage medium for a user associated with the identification information, and controlling image formation based on the result of the determination is proposed.

In the setting of the media used for the print job, there are cases in which an attribute designation indicating, in addition to an identifier of the media, properties of the media such as a grammage, a surface property, a shape, a color, or the like, is performed. Because the attributes that express media vary greatly, and supporting all of them is not realistic, attributes having a high degree of importance may be supported as designatable attributes in accordance with the capabilities of the digital printer and the user of the digital printer. If an attribute designation is performed, the following problems may occur on a digital printer.

Explanation is given of an example in which 2 operators A and B share one digital printer in separate intervals to execute jobs. For example, the operator A and the operator B send a plurality of print jobs to be executed to a holding function that the digital printer is provided with in advance, and it is envisioned that subsequent printing is performed collectively when it is possible to monopolize the use of the digital printer. Firstly, operator A sends a plurality of jobs to the digital printer. At the stage at which they are inputted, one of the media entries (media information) that the digital printer manages is selected, and is stored in the job hold in an associated state. Operator B similarly performs a media designation by an attribute designation, and sends a plurality of jobs to the digital printer. At the stage at which they are inputted, the media entries that the digital printer manages are selected, and stored in the job hold in an associated state. Note that the media mismatch determination is performed upon job inputting.

When the operator A can monopolize use of the digital printer, jobs that he himself stored in the holding function are listed, and the physical media to actually be used is determined. At this time, for media entries that are mismatches in the media mismatch determination, the operator A can start printing having edited the attributes to match the physical media to actually be used.

Assume that the usage of the digital printer by the operator A finishes, and next the operator B uses the same digital printer. Hypothetically, a case is envisioned in which a job by the operator B references a media entry that is the same as the media entry that the operator A, which is the previous device user used. As described above, the operator A, in order to execute a print job that he is in charge of, obtains a resulting document in a desired form having edited the attributes of the media entry at the operator's own discretion. Accordingly, there is no guarantee that a media entry in such a state will be similarly suitable for the operator B. If the operator B neglects to confirm the attributes of the media entry, or overlooks important attribute information, a resulting document using media that is inappropriate for the operator B will be generated.

SUMMARY OF THE INVENTION

The present invention enables realization of an apparatus and a method in which for media information that a plurality of operators reference, even if there is the need to use it having edited a portion of attributes of the media information, a desired resulting document is suitably output even for other operators whose use it later.

One aspect of the present invention provides a printing apparatus, comprising: a holding unit configured to hold a print job; an executing unit configured to execute the print job held in the holding unit; a storing unit configured to store a plurality of sheet attribute information for each sheet, the print job held in the holding unit being executed by the executing unit based on sheet attribute information stored in the storing unit; a displaying unit configured to display the plurality of sheet attribute information stored in the storing unit; a selecting unit configured to select sheet attribute information from out of the plurality of sheet attribute information displayed by the displaying unit; a changing unit configured to change the sheet attribute information selected by the selecting unit; and a controlling unit configured to control so that sheet attribute information that matches sheet attribute information used in the print job held in the holding unit, of the plurality of sheet attribute information stored in the storing unit, is not changed by the changing unit.

Another aspect of the present invention provides a printing apparatus, comprising a holding unit configured to hold a print job; an executing unit configured to execute the print job held in the holding unit; a storing unit configured to store a plurality of sheet attribute information for each sheet, the print job held in the holding unit being executed by the executing unit based on sheet attribute information stored in the storing unit; a displaying unit configured to display the plurality of sheet attribute information stored in the storing unit; a selecting unit configured to select sheet attribute information from out of the plurality of sheet attribute information displayed by the displaying unit; a changing unit configured to change the sheet attribute information selected by the selecting unit; and a notification unit configured to prompt, in a case where the sheet attribute information selected by the selecting unit matches the sheet attribute information used in the print job held in the holding unit, a user with a warning for causing the user to confirm whether to change the sheet attribute information selected by the selecting unit.

Still another aspect of the present invention provides a control method in a printing apparatus, the control method comprising: holding, in a holding unit, a print job; executing the print job held in the holding unit; storing, in a storing unit, a plurality of sheet attribute information for each sheet, the print job held in the holding unit being executed based on sheet attribute information stored in the storing unit; displaying the plurality of sheet attribute information stored in the storing unit; selecting sheet attribute information from out of the plurality of sheet attribute information displayed; changing the selected sheet attribute information; and controlling so that sheet attribute information that matches sheet attribute information used in the print job held in the holding unit, of the plurality of sheet attribute information stored in the storing unit, is not changed.

Yet still another aspect of the present invention provides a non-transitory computer readable storage medium for storing a computer program for controlling a printing apparatus, the program comprising: a code to hold, in a holding unit, a print job; a code to execute the print job held in the holding unit; a code to store, in a storing unit, a plurality of sheet attribute information for each sheet, the print job held in the holding unit being executed based on sheet attribute information stored in the storing unit; a code to display the plurality of sheet attribute information stored in the storing unit; a code to select sheet attribute information from out of the plurality of sheet attribute information displayed; a code to change the selected sheet attribute information; and a code to control so that sheet attribute information that matches sheet attribute information used in the print job held in the holding unit, of the plurality of sheet attribute information stored in the storing unit, is not changed.

Further features of the present invention will be apparent from the following description of exemplary embodiments with reference to the attached drawings.

BRIEF DESCRIPTION OF THE DRAWINGS

FIG. 6 is a view for illustrating an example of print job settings data that a computer generates, and transmits to the digital printer 102 according to a first embodiment.

FIG. 7 is a view for illustrating an example of media information prior to it being improved that a media management unit 211 of the digital printer 102 according to a first embodiment manages.

FIG. 8 is a view for illustrating an example of print job settings data different to that of FIG. 6 that a computer generates, and transmits to the digital printer 102 according to a first embodiment.

FIG. 9 is a view for illustrating an example of a state of media information other than that illustrated in FIG. 7.

FIG. 10 is a view for illustrating an example of media information that the media management unit 211 of the digital printer 102 according to a first embodiment manages.

FIG. 11 is a view for illustrating an example of a state of media information other than that illustrated in FIG. 10.

FIG. 12 is a view for illustrating an example of the media information illustrated in FIG. 11 post-editing.

FIG. 18 is a view for illustrating an example of media information that the media management unit 211 of the digital printer 102 according to a second embodiment manages.

FIG. 19 is a view for illustrating an example of a state of media information other than that illustrated in FIG. 18.

FIG. 20 is a view for illustrating a further example of a state of media information other than that illustrated in FIG. 18.

FIG. 22 is a view for illustrating an example of media information that the media management unit 211 of the digital printer 102 according to a third embodiment manages.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<System Configuration>

Figure 1:
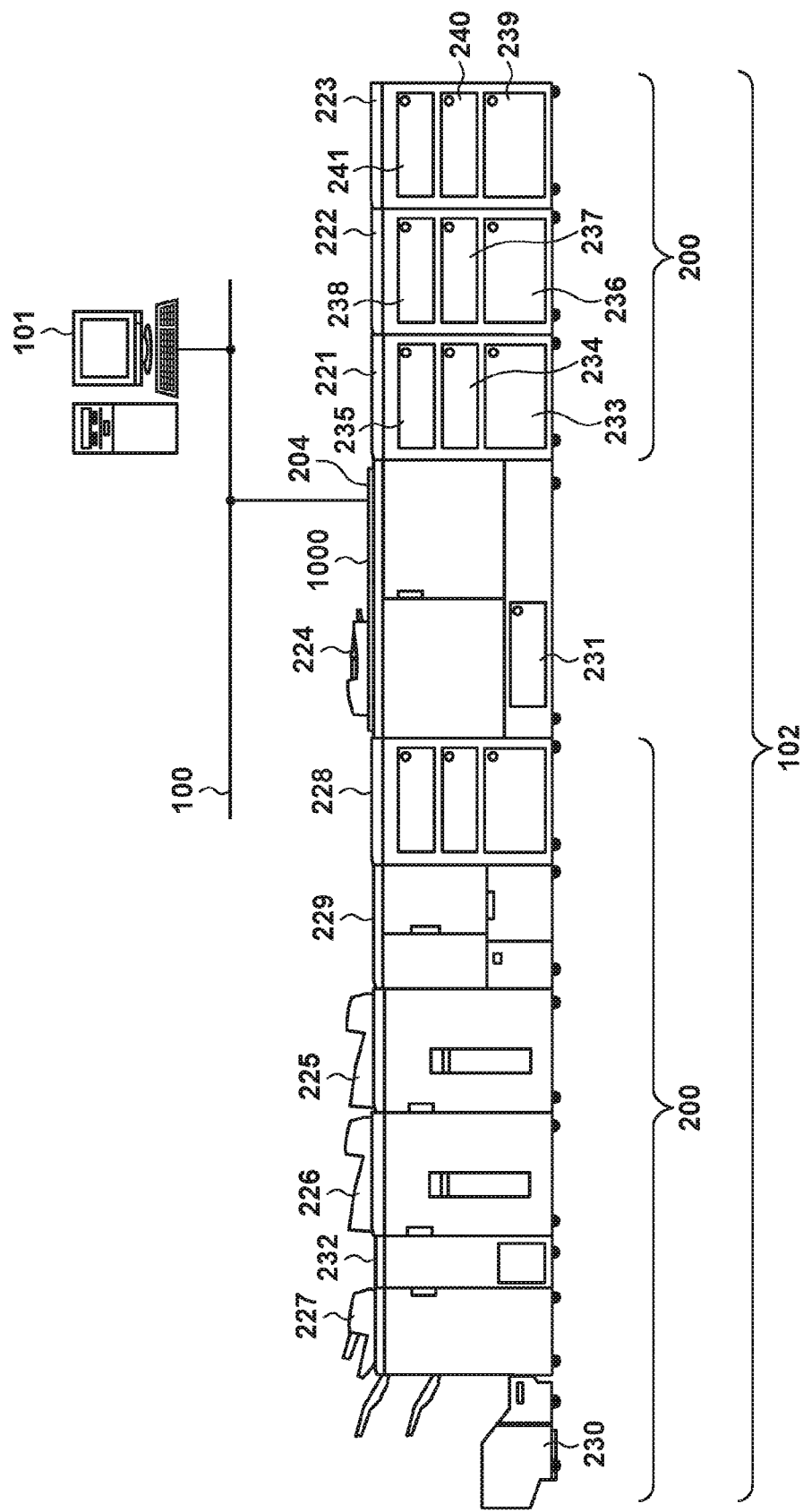
FIG. 1 is a view for explaining an example of an overall configuration of a system and a digital printer 102 according to a first embodiment.

Below, explanation will be given a first embodiment of the present invention with reference to FIG. 1 through FIG. 17. Firstly, with reference to FIG. 1, explanation will be given for a configuration of a digital printer directed to a POD market, and a configuration of a system in which it is used according to the present embodiment. As shown in FIG. 1, a plurality of apparatuses are connected via a network 100. Here, an example of a case in which a digital printer 102 and a computer 101 are connected is illustrated, but the system of the present invention is not limited to this configuration, and configuration may be taken such that various other apparatus are included.

The digital printer 102 is an example of a printing apparatus, and apparatuses having a plurality of differing roles are connected to each other, and complicated sheet processing is possible. Below, explanation is given regarding each part configuring the printing apparatus.

A printer unit 1000 is an apparatus for conveying media stored in a later explained sheet feeding unit, and performing image formation of expanded image data using toner on the media. More specifically, firstly, for example a ray such as a laser beam, which is modulated in accordance with image data, is incident on a rotational polygonal mirror (polygon mirror, or the like), and is irradiated on a photosensitive drum as reflected scanning light via a reflection mirror. A latent image formed by the laser beam on the photosensitive drum is developed by a toner, and a toner image is transferred to sheet material, i.e. media, attached on the transfer drum. By sequentially executing this sequence of image forming processes for yellow (Y), magenta (M), cyan (C) and black (K) toner, a full color image is formed. Also, configuration may be taken in which in addition to the foregoing four colors, toner referred to as a special color, a transparent toner, or the like, can be transferred. A sheet material on a transfer drum on which an image is formed in full color is conveyed to a fixing unit. The fixing unit is configured by a combination of rollers and a belt, a heat source such as a halogen heater is built-in, and the toner on the sheet material to which the toner image is transferred is melted and fixed by heating and pressure.

Also, in the printer unit 1000 of the digital printer 102, a scanner 224 and an operation unit 204 arranged on an upper surface of the printer unit 1000 are provided. The operation unit is arranged on the upper surface of the printer unit 1000 and so it is not shown graphically in this figure. The operation unit 204 provides various interfaces for the operator to perform various settings and operations on the printer unit 1000 according to the present invention.

The digital printer 102 is configured such that in addition to the printer unit 1000, various additional devices can be mounted. Below, explanation will be given for various additional devices. Large capacity sheet feeding apparatuses 221, 222, 223 are sheet feeding apparatuses configured to be attachable/removable to/from the main body. As shown in FIG. 1, it is possible to attach a plurality of sheet feeding apparatuses. Also, each sheet feeding apparatus further comprises a plurality of the sheet feeding units 233, 234, 235, 236, 237, 238, 239, 240 and 241. As previously described, a plurality of large capacity sheet feeding apparatuses are mountable, and therefor the configuration is such that it is possible to improve convenience during execution of larger capacity print processing by the digital printer 102.

Large-volume stackers 225, 226 are apparatuses for stacking printed media output in large volume. In a device comprising a large capacity sheet feeding apparatus, inevitably the generated output material will be of a large capacity, and so this kind of apparatus becomes necessary. In the configuration according to the present embodiment illustrated in FIG. 1, a configuration in which two large-volume stackers are connected is illustrated.

For the large-volume stackers 225, 226, it is possible to instruct processing for opening an outside lid in order to retrieve media stacked on an internal stacking tray by an explicit operation of an operator. At the same time, configuration is taken such that it is possible to automatically open the outside lid by an instruction from the printer unit 1000. Note that if processing for opening the outside lid is executed, processing for stacking printed media on the large-volume stackers 225, 226 is controlled to be stopped beforehand. Furthermore, for the large-volume stackers 225, 226, it is possible to configure so as to comprise a function for shifting the stacking position of arbitrary media when stacking printed media With this, it is possible to make sorting processing, which is performed in units of a fixed bundle when an operator later retrieves media stacked in a large volume, easy.

A folding device 232 is an apparatus for executing various complicated folding processing such as center-folding, z-folding, three-folding, four-folding or the like. A saddle stitching apparatus 227 is equipped with various units capable of executing stapling processing, saddle stitching, saddle folding, punching processing, shift discharge processing, or the like, for when creating book-bound output material on sheets from the printer unit 1000. Note that, in the digital printer 102 in the present embodiment, when creating saddle stitching output material using the saddle stitching apparatus 227, the folding function of the folding device 232 which is described previously is not used, and rather formation of an output material is performed by combining a saddle folding function and a saddle stitching function that the saddle stitching apparatus is equipped with. A trimming apparatus 230 is an apparatus for conveying book-bound output material that is saddle stitched in the saddle stitching apparatus 227, trimming portions corresponding to fore edges, and forming fore edges on a plane.

An inserter 228 is a unit having a function for inserting media held in the inserter at an appropriate timing based on settings for media sent from the printer unit. By the inserter, it becomes possible to insert media for which printing is not required between printed media. The illustrated inserter 228 is provided with a plurality of large capacity sheet feeding units so as to be able to endure large capacity print processing similarly to the large capacity sheet feeding apparatuses 221, 222, 223 which are described previously.

A case binding apparatus 229 is an apparatus for forming a case binding output material by performing gluing processing for a cover on one bundle's worth of media which is printed by the printer unit 1000 or inserted in the inserter 228. Alternatively, pad binding processing corresponding to processing for a glue binding without attaching a cover can be executed by the case binding apparatus 229. The case binding apparatus 229 is a sheet processing apparatus capable of executing at least case binding processing, and consequently is referred to as a case binding apparatus.

The digital printer 102 can be taken as being divided into three main portions by the borders of the printer unit 1000. Additional devices arranged on the right side of the printer unit 1000 in FIG. 1 are referred to as a sheet feeding apparatus. The main role of the sheet feeding apparatus is to consecutively supply the printer unit with media loaded internally at an appropriate timing. Also, they perform detection of the remaining amounts of media loaded internally. Also inside of the printer unit 1000, a paper feed tray 231 is present, and functionally it can perform equivalent execution to the sheet feeding apparatus. In the explanation, these paper feed trays that the printer unit itself comprises will be referred to as the sheet feeding apparatus.

Meanwhile, additional devices arranged on the left side of the printer unit 1000 in FIG. 1 are referred to as a sheet processing apparatus. The sheet processing apparatus, in addition to various processing of media for which print processing is completed, performs processing such as accumulating. In the hereinafter explanation, the previously described sheet feeding apparatus and the sheet processing apparatus together will be referred to as a sheet processing apparatus 200.

The computer 101 is a general-purpose computer connected to the digital printer 102 via the network 100. Here, various application programs are executable, and are capable of transmitting print jobs to the printing apparatus.

<Printing Apparatus Configuration>

Next, with reference to FIG. 2, explanation will be given for an internal configuration (mainly a software configuration) of the digital printer 102 according to the present embodiment. Blocks illustrated in this figure are divided in system block level units, and portions that do not necessarily correspond to the device configuration units illustrated in FIG. 1 exist.

The digital printer 102 is equipped with a non-volatile memory such as a hard disk drive 209 (hereinafter referred to as HDD) which is capable of internally storing data of a plurality of jobs that are the targets of processing. Note that, an example is illustrated in which the digital printer 102 uses the HDD in the present embodiment, but limitation is not made to the HDD if it is a storage apparatus that is similarly large capacity and non-volatile.

Also, the digital printer 102 is equipped with a copy function for printing by a printer unit 203 via the HDD 209 job data accepted from a scanner unit 201 which is explained later. Furthermore, a print function for printing by the printer unit 203 via the HDD 209 job data accepted via an external I/F 202 unit corresponding to an example of a communication unit from an external apparatus, or the like, is provided. The digital printer 102 is an MFP type printing apparatus (referred to as an image forming apparatus) equipped with such a plurality of functions. To put it differently, the digital printer 102 of the present embodiment may be of any configuration capable of executing various control described in the present embodiment, and may be a printing apparatus capable of color printing, or a printing apparatus capable of monochrome printing.

The digital printer 102 is equipped with the scanner unit 201 which reads an original image, and performs image processing on read image data. Also, the external I/F 202 which transmits/receives image data or the like with a facsimile machine, a network connected device and an external dedicated device is provided. Furthermore, the HDD 209 which is capable of storing image data of a plurality of printing target jobs that are accepted from either the scanner unit 201 or the external I/F 202 is provided with respect to a print medium.

In the HDD 209, various management information that is persistently stored, changed and managed by the digital printer 102 is stored. Also, the printer unit 203 which executes print processing, with respect to print media, of data of jobs that are printing targets stored in the HDD 209 is provided. Furthermore, the digital printer 102 is equipped with the operation unit 204 which comprises a display unit which corresponds to an example of a user interface unit.

A controller unit (referred to as a control unit or a CPU) 205 which is an example of a control unit that the digital printer 102 is equipped with comprehensively controls processing, operation, or the like, of each unit that the digital printer 102 is equipped with. In the ROM 207, various control programs required in the present embodiment including programs for executing various processing, or the like, of later explained flowcharts, are stored. Also, in the ROM 207, a display control program for causing a display unit of the operation unit 204 to display various UI screens including user interface screens (hereinafter referred to as UI screens) that are shown graphically is stored.

The controller unit 205, by reading and executing programs of the ROM 207, causes various operations explained in the present embodiment to be executed by the digital printer 102. A program, or the like, for executing operation to load raster image data (bitmap image data) by interpreting page description language (hereinafter referred to as the abbreviation PDL) data received from the external apparatus via the external I/F 202 is stored in the ROM 207. Similarly, a program, or the like, for interpreting and processing a print job received from an external apparatus via the external I/F 202 is stored in the ROM 207. This is processing by software.

The ROM 207 is a read-only memory and in it various programs such as programs for a boot sequence, font information, or the like, and the above described programs, or the like, are stored in advance. Details of various programs stored in the ROM 207 are described later. A RAM 208 is a readable and writable memory, and it stores image data sent from the scanner unit 201 or the external I/F 202 and various programs and setting information.

Also, the HDD 209 is a large capacity storage apparatus that stores image data compressed by a compression/expansion unit 210. Configuration is taken such that it is possible to hold a plurality of data items such as print data of a job that is a processing target in the HDD 209. The controller unit 205 controls to be able to print by the printer unit 203 via the HDD 209 data of a job that is a processing target which was input via one of various input units such as the scanner unit 201 or the external I/F 202 or the like. Also, control is taken to be able to transmit to an external apparatus via the external I/F 202. In this way, various processing for outputting of data of jobs that are processing targets and are stored in the HDD 209 are controlled by the controller unit 205 so they can be executed.

The compression/expansion unit 210 performs compression/expansion operations on image data or the like that is stored in the RAM 208 or the HDD 209 in accordance with various compression schemes such as JBIG, JPEG, or the like. Based on a configuration as described above, the controller unit 205 that the printing system is equipped with controls various operations of the sheet processing apparatus 200.

The sheet processing apparatus 200 corresponds to the sheet feeding apparatuses and the sheet processing apparatuses explained in FIG. 1. The media management unit 211 is a module for managing information related to media types that the digital printer 102 is capable of processing.

<Information Processing Apparatus Configuration>

Figure 3:
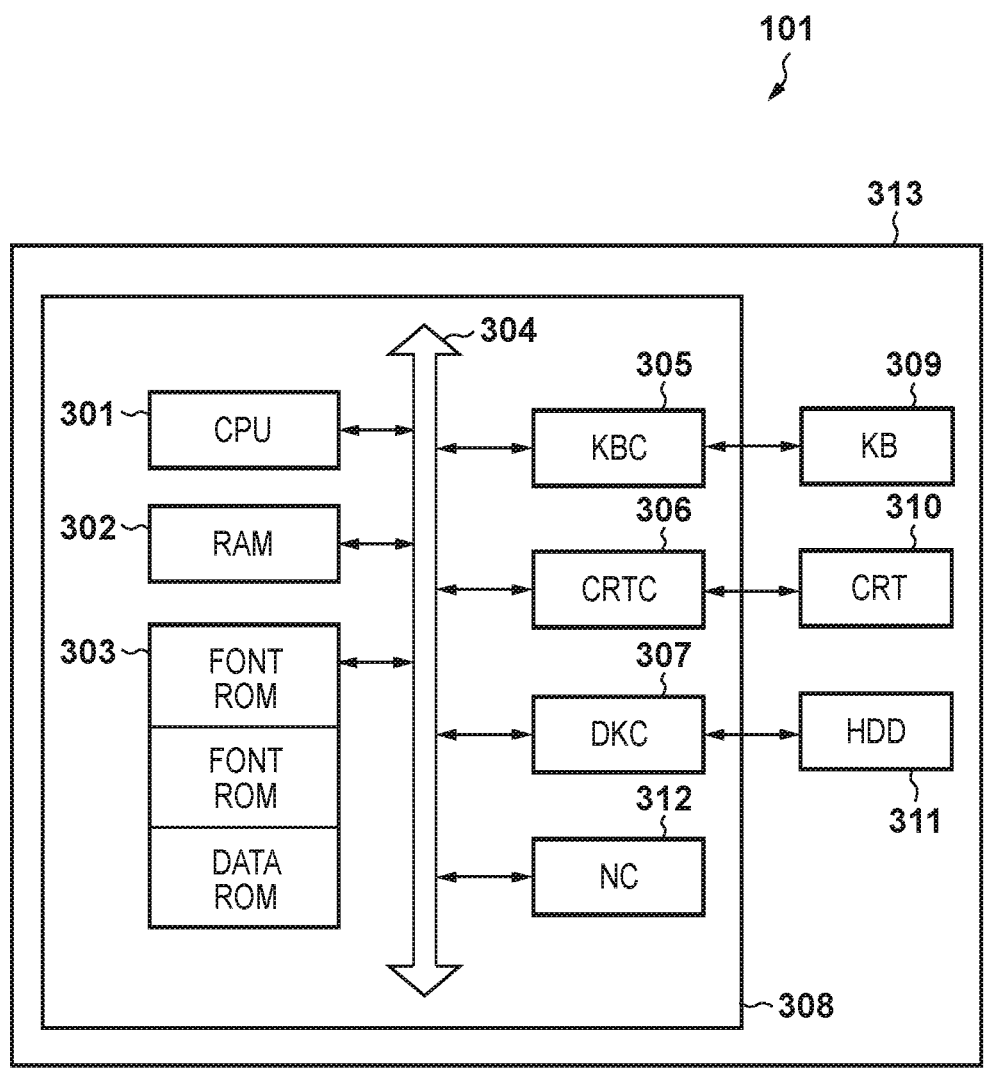
FIG. 3 is a view for explaining a configuration of an apparatus that enables inputting of jobs into the digital printer 102 according to a first embodiment.

Next, with reference to FIG. 3, explanation will be given for an internal configuration of the computer 101 which is an information processing apparatus. A CPU 301 executes programs such as an OS, general applications, a bookbinding application which are stored in a ROM for programs of a ROM 303 or loaded from the HDD 311 into a RAM 302. The RAM 302 functions as a main memory or a work area or the like of the CPU 301. A keyboard controller (KBC) 305 controls key input from a keyboard 309 or a pointing device or the like. A CRT controller (CRTC) 306 controls a display of a CRT display 310. A disk controller (DKC) 307 controls access to the HDD 311, a floppy (registered trademark) disk (FD), or the like, which stores a boot program, various applications, font data, user files, or the like. A printer controller (PRTC) 308 controls an exchange of signals with the printer unit 1000 which is connected. A network controller (NC) 312 is connected to a network, and executes control processing for communication with other devices that are connected to the network.

<Configuration of Printing Apparatus Programs and Data>

Figure 4:
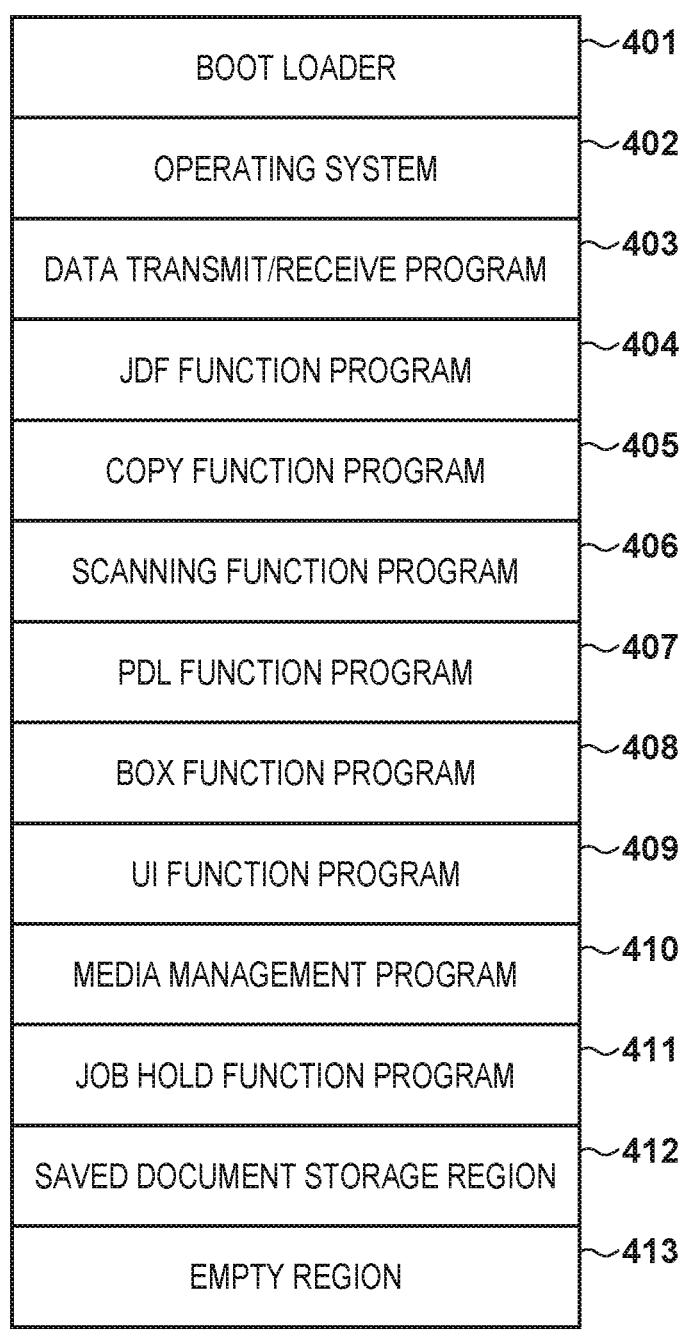
FIG. 4 is a view for explaining various data stored in a ROM 207 included in a configuration of the digital printer 102 according to a first embodiment.

Next, with reference to FIG. 4, explanation will be given for various programs read and executed by the controller unit 205 in the digital printer 102, and data used by these programs which are stored in the ROM 207. As is illustrated in FIG. 4, in the ROM 207, control programs for realizing various functions that the digital printer 102 is able to provide are stored.

A boot loader 401 is a program that is executed immediately after a power supply activation of the digital printer 102. In the boot loader 401, a program for executing various activation sequences that are necessary for system activation is included. An operating system 402 is a program whose object is to provide an execution environment for various programs that realize functions of the digital printer 102. This mainly provides functions such as resource management of memory of the digital printer 102, i.e. the ROM 207, the RAM 208, the HDD 209 or the like in FIG. 2, basic input/output control of various apparatuses, or the like.

Figure 2:
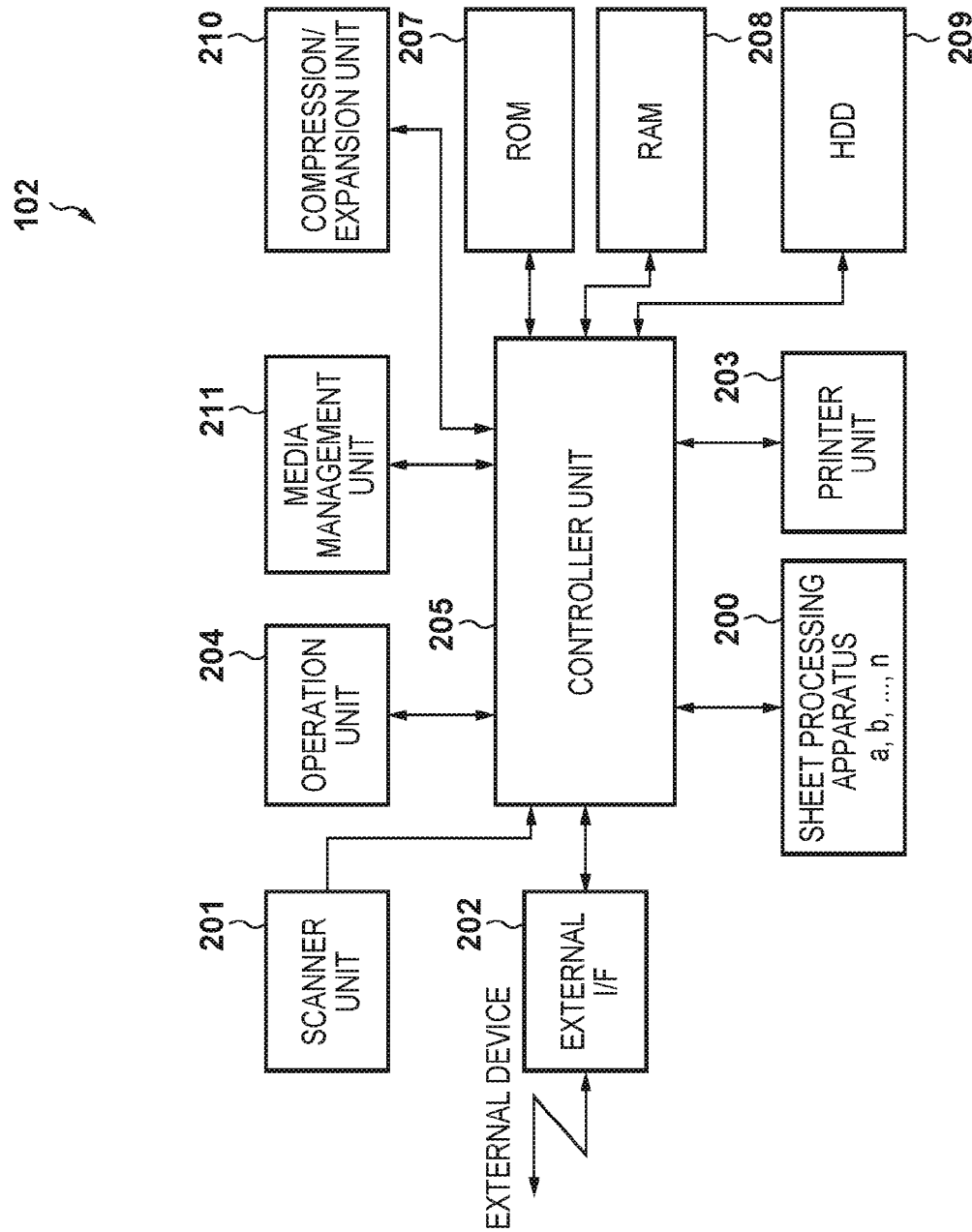
FIG. 2 is a view for explaining an internal system configuration of a system and a digital printer 102 according to a first embodiment.

A data transmit/receive program 403 is a control program for performing transmission and reception processing performed when a data input/output request occurs via the external I/F 202 in FIG. 2. More specifically, it is a control program that contains a protocol stack such as one for TCP/IP and is for performing communication of various data that is communicated with an external device or the like that is connected via the network 100. The communication processing performed here is in charge of processing specialized for communication processing such as that of a level of transmission/reception of data packets inputted/outputted between the digital printer 102 and the external I/F 202 or that of an HTTP server, or the like, and later explained processing for analysis of the content of received data is not included. Data analysis processing is executed based on description content of another program by the controller unit 205 which is described later.

A JDF function program 404 is a program for executing a JDF print function executed by the controller unit 205 by an instruction of the external I/F 202 in a case where JDF job data is received at the digital printer 102 via the external I/F 202. Note that JDF stands fro Job Definition Format. In the JDF print function performed by the controller unit 205, operation of each device is instructed sequentially in an appropriate order by the controller unit 205 based on a processing order and processing conditions described by the program. As a result, in the end control is performed so that JDF print processing is executed. The sheet processing apparatus 200, the printer unit 203, the HDD 209, the compression/expansion unit 210, the RAM 208 or the like of FIG. 2 are included in the devices. Also, processing for analysis of the JDF job data received via the external I/F 202, and processing for determining whether or not the result of the analysis processing is that an incorrect setting is included in the JDF, and a program for performing setting change or the like for resolving incorrect settings is included.

A copy function program 405 is a program for executing a copy function which is executed by the controller unit 205 according to an instruction from the operation unit 204 when via the operation unit 204 a user of the digital printer 102 instructs the execution of a copy function. The copy function is realized by sequentially instructing operation of each of these devices in an appropriate order by the controller unit 205 based on a processing order and processing conditions described in the program for resources in the digital printer 102. Accordingly, in the end control is performed so that copy processing is executed. In each previously described devices, the scanner unit 201, the printer unit 203, the sheet processing apparatus 200, the HDD 209, the compression/expansion unit 210, the RAM 208 or the like are included.

A scanning function program 406 is a program for executing a scan function which is executed by the controller unit 205 according to an instruction from the operation unit 204 when via the operation unit 204 a user of the digital printer 102 instructs the execution of a scan function. The scan function which is performed by the controller unit 205 is executed as follows. Modules such as the scanner unit 201, the HDD 209, the compression/expansion unit 210, the RAM 208, or the like, are controlled by the controller unit 205 based on the processing order and processing conditions described in the program for resources in the digital printer 102. Here, by sequentially instructing operation of each of these devices in an appropriate order, control is performed such that in the end scan processing is executed.

A PDL function program 407 is a program for executing a print function executed by the controller unit 205 upon an instruction of the external I/F 202 in a case where PDL data (print job data) is received at the digital printer 102 via the external I/F 202. The PDL print function is realized by sequentially instructing operation of various devices in an appropriate order by the controller unit 205 based on the processing order and processing conditions described in the program. As a result, in the end control is performed so that PDL print processing is executed. The sheet processing apparatus 200, the printer unit 203, the HDD 209, the compression/expansion unit 210, the RAM 208 or the like are included in the devices.

A box function program 408 is a program for executing a BOX function which is executed by the controller unit 205 according to an instruction from the operation unit 204 when via the operation unit 204 a user of the digital printer 102 instructs the execution of a BOX function. The BOX function is realized by sequentially instructing operation of each of these devices in an appropriate order by the controller unit 205 based on a processing order and processing conditions described in the program for the digital printer 102. The scanner unit 201, the printer unit 203, the sheet processing apparatus 200, the HDD 209, the compression/expansion unit 210, the RAM 208 or the like are included in the devices. For stored job data, it is possible execute having changed settings made when storing.

A UI function program 409 is a program for controlling the operation unit 204. The UI function program 409 identifies content input on the operation unit 204 by a user of the digital printer 102, and performs appropriate screen transition and makes processing request instructions towards the controller unit 205. A media management program 410 is a program for executing a management function related to media that the digital printer 102 is capable of using. The media related information managed by the program is stored on the HDD 209 by processing of this program.

A job hold function program 411 is a program which is executed by the controller unit 205 according to an instruction from the operation unit 204 when via the operation unit 204 a user of the digital printer 102 instructs the execution of the job hold function. In this function, by sequentially instructing, for the digital printer 102, operation of each of these devices in an appropriate order by the controller unit 205 based on a processing order and processing conditions described in the program, control is performed so that job hold print processing is executed. The printer unit 203, the sheet processing apparatus 200, the HDD 209, the compression/expansion unit 210, the RAM 208 or the like are included in the devices. For stored job data, it is possible execute the job having changed settings made upon storage.

When print job data for a job hold function of the digital printer 102 from the computer 101 which is an external device is stored, it is performed based on the following procedure. Specifically, in place of the PDL function program 407 or the JDF function program 404 or the like performing print processing of job data, storage is instructed towards the job hold function. By the PDL function program 407 or the JDF function program 404, whether to perform a print instruction or whether to perform processing for storing to the job hold function is in accordance with designation of a printing application that operates on the computer 101 which is the job input destination. This designation is reflected in the setting attributes of the job data that is the target that is processed by the PDL function program 407 or the JDF function program 404, or the like, and the PDL function program 407 or the JDF function program 404 executes switching of processing based on the setting attributes.

Note that, it is not necessary to provide all of the various function programs explained in the present embodiment, and a configuration may be taken in which a portion of these, or function programs other than those previously described are provided. In either case, it goes without saying that the present invention is effective so long as the elements recited in the claims are satisfied.

A saved document storage region 412 is a storage region for save job data managed by the job hold function program 411. Job data received from an unit external to the digital printer 102 that is the target of saving is stored together with a print setting in this region.

<Information Processing Apparatus Program Configuration>

Figure 5:
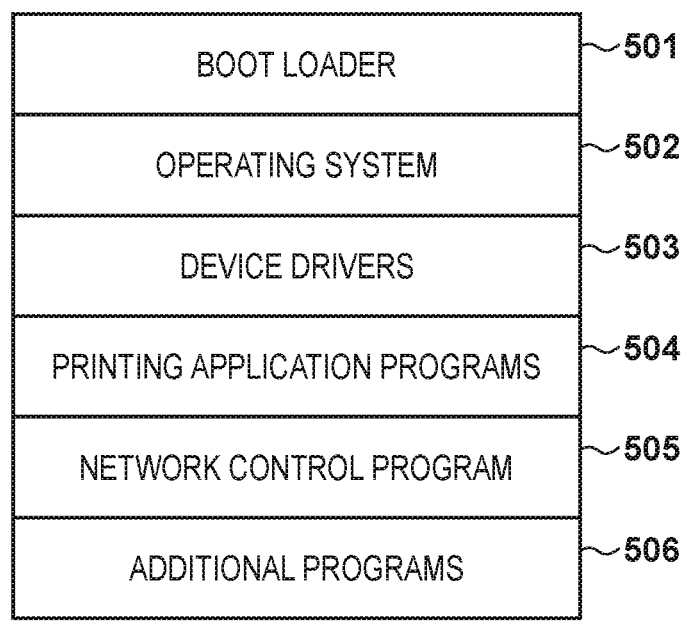
FIG. 5 is a view for explaining various data stored in an HDD 311 included in a configuration of a computer according to a first embodiment.

Next, with reference to FIG. 5, explanation will be given for a configuration of various programs that are stored in the HDD 311 of the computer 101 which is an information processing apparatus, and which are read and executed by the CPU 301. Operation of a boot loader 501 and an operating system 502 is the same as that of the boot loader 401 and the operating system 402 of the printing apparatus in FIG. 4, and therefore explanation is omitted.

Device drivers 503 are programs for controlling various hardware connected to the computer 101. Programs for controlling the KBC 305, the CRTC 306, the DKC 307, and the like, are included.

The printing application programs 504 operate on the computer, and this is a generic term for programs whose object is to provide various functions, services or the like to a POD system user. The printing application programs 504 have functions for generating or editing print job data. Also, similarly, the printing application programs 504 have functions for converting from various print requirements set by a setting screen (not shown) of the application into corresponding print settings.

Furthermore, the applications can conversely convert from settings included in print settings into internal information necessary for controlling corresponding display items of setting screens of the printing application programs 504. Furthermore, the printing application programs 504 have functions for selecting a print setting file saved in the HDD 311, and generating print job data. The printing application programs 504 have a capability to convert into a PDL command format or a JDF format as a print setting, and to generate print job data by synthesizing print target data.

A network control program 505 is a program executed when transmitting a print job to the digital printer 102 which is connected by the network 100 for print job data generated by the printing application programs 504. It is possible to have a configuration in which this program has a function such as one for transmitting print data, and acquiring progress information of a print job executed by the digital printer 102 connected the computer 101 for the progress of print processing after the transmission. In additional programs 506, all program groups that do not correspond to any of those described above are included, but detailed explanation is omitted.

<Print Settings: Operator A>

Next, with reference to FIG. 6, explanation will be given for print settings of a save-type print job that is transmitted from the computer 101 to the digital printer 102, and stored by the job hold function program 411. The computer 101, in addition to the print settings illustrated in FIG. 6, sends print target data to the digital printer 102. In the digital printer 102, the external I/F 202 receives print job data including print settings, and in accordance with various function programs illustrated in FIG. 5 being executed by control of the controller unit 205, print processing is performed.

In FIG. 6, as an example of a print setting format, the case of JDF (Job Definition Format) is illustrated. However, the present invention may use print settings based on a print-type format other than JDF. Here, because exemplification is for JDF, explanation will be given of an example of a case in which a print job operates in accordance with the JDF function program 404 illustrated in FIG. 5.

Reference numeral 601 denotes a portion in which a designation of media in accordance with the JDF format is included. Reference numeral 602 represents a size of media, and reference numeral 603 represents a grammage in the JDF format. In other words, the JDF illustrated in FIG. 6 is a setting scheme for designating media in accordance with an attribute designation; the attributes designated at that time are size and grammage, and values of these are, for example, A4 and 100. In FIG. 6, an example is given in which other media attributes such as a color, a surface property, or the like, are not designated as an example, but designation of other media attributes may be performed. Note that in the following explanation, the operator that inputs the print job of FIG. 6 is explained as the operator A.

<Media Information>

Next, explanation will be given with reference to FIG. 7 of an example of media information that the media management unit 211 of the digital printer 102 in the present invention manages. The media information is saved and managed in the RAM 208 and 209 by the controller unit 205 executing the media management program 410.

A state in which 5 types of media as illustrated by reference numerals 701 to 705 are registered is illustrated. As a matter of course, in the digital printer 102, it is possible to handle an overwhelmingly larger number of media types than the number illustrated in FIG. 7.

The fields illustrated by reference numerals 706 to 712 indicate media attributes corresponding to each medium. An ID 706 is an ID assigned uniquely for media under the management of the media management unit 211. Though not explained in this embodiment, by including this ID in the print settings it is possible to designate the media by the ID.

A name 707 is character string for a name given to the media. A grammage 708 is a number that represents a weight for a unit area of the media. A surface property 709 is a field for recording a parameter relating to a surface property of the media. A shape 710 is a field for recording a characteristic parameter relating to a shape of the media. A color 711 is a field for recording a parameter relating to a color of the media. A size 712 is a field for recording a parameter relating to a size of the media. Note that in the case of the digital printer 102 in the first embodiment of the present invention, the size 712 is not necessary. Accordingly, in the media indicated by reference numerals 703 and 704, a special value called ANY for identifying that an explicit value is not input into the field for the size 712 is allocated.

The intention is that the system guarantees that the ID 706 be unique, and a user lacks the authorization to edit it. Meanwhile, configuration is taken such that a system administrator of the digital printer 102 can change the name 707, the grammage 708, the surface property 709, the shape 710, the color 711 and the size 712.

A case is envisioned in which a state of a media entry for which a print job including the settings illustrated in FIG. 6 is registered is input into the digital printer 102. The media settings in FIG. 6 are attribute designations, and for the designated attributes, the size is A4 and the grammage is 100. In the media illustrated in FIG. 7, a media entry illustrated by reference numeral 702 is the one that matches these conditions. Accordingly, if a print job including the settings illustrated in FIG. 6 is input into the digital printer 102, it is stored within the digital printer 102 by the job hold function in a state in which it is instructed so that the media entry illustrated in reference numeral 702 is used.

For example, if a print job including attribute designation is input into the digital printer 102, cases may exist in which a media entry that matches the media attribute conditions of the job setting does not exist. The example of FIG. 6 corresponds to a case in which a media entry for which the size is A4 and the grammage is 100 does not exist in any of the entries illustrated in FIG. 7. There exists a plurality of methods as avoidance processing in the digital printer 102 in such a case.

First, transitioning to an optimal paper outage mode which is a representative behaviour in the case where there are no appropriate sheets can be considered. However, in the present embodiment, a use case is envisioned in which a print job is stored in a job hold, and is printed at a later stage having been stored. Accordingly, even in the case where a paper outage is detected, control is performed so that the job is stored in the job hold, and the paper outage phenomenon occurs at a stage in which print processing is performed for the job in the job hold.

Second, a mode for selecting a default sheet can be considered. A use case is envisioned in which even if it does not correspond to anything, it is provisionally mapped to one of the media types that the media management unit manages, and the operator, at a later stage, changes a media setting as necessary.

Third, an automatic registration mode for media can be considered. This is a mode in which, if it is determined that a suitable media entry does not exist, based on the media attribute information items included in the job settings, a media entry that includes these is added to the media information illustrated in FIG. 7, and what is added is stored in a selected state.

<Print Settings: Operator B>

FIG. 8 illustrates an example of print settings of a save-type print job other than that of FIG. 6 that are transmitted from the computer 101 to the digital printer 102, and stored by the job hold function program 411. An example of a job that the operator issues other than that of FIG. 6 is envisioned. These print settings are sent to the digital printer 102 together with print target data similarly to the print settings of FIG. 6. Here as well, similarly to in FIG. 6, a case is illustrated in which JDF is given as example of the print setting format.

In various settings included in the JDF of FIG. 8, a portion illustrated by the reference numeral 801 is a portion in which a media designation according to the JDF format is included. Reference numeral 802 represents a size of media, and reference numeral 803 represents a color in the JDF format. In other words, the JDF illustrated in FIG. 8 is a setting scheme for designating media in accordance with an attribute designation; the attributes designated at that time are size and color, and values of these are, for example, A4 and white. Other media attributes such as the grammage, surface property, or the like, are not designated.

Accordingly, if a print job including the settings illustrated in FIG. 8 is input into the digital printer 102, it is stored within the digital printer 102 by the job hold function in a state in which it is instructed so that the media entry illustrated in reference numeral 702 is used. Below, the operator that inputs the print job illustrated in FIG. 8 is explained as the operator B.

<Post-Editing Media Information>

Next, with reference to FIG. 9, explanation is given for a state immediately after editing a media entry to be used prior to execution of processing for outputting the job stored by the operator A. As illustrated in FIG. 9, in the media entry illustrated by reference numeral 702, the grammage and the color are changed to 120 and red. Note that this editing content itself has no meaning in the present invention. This merely illustrates an example of editing content for when the operator A edits the attributes of a media entry prior to printing. In any case, the following explanation is given assuming that this editing content is desired by the operator A to be the usage media.

Assume that output of the print job illustrated in FIG. 6 ends, the operator A releases the digital printer 102, and transfer is made to the next operator, e.g. the operator B. The print job of the operator B, as is explained using FIG. 8, is stored in a state in which the media entry illustrated by reference numeral 702 of FIG. 9 is associated as the usage target media as is explained using FIG. 8. If the state of the media entry at the stage at which the print job of FIG. 8 is input is the state illustrated in FIG. 7, the media entry of reference numeral 702 is saved as being the one that matches the conditions with respect to the media settings of the print job in FIG. 8. However, due to the media entry illustrated by reference numeral 702 being edited in the interval in which the operator A monopolizes the digital printer 102 thereafter, the conditions of the media entry cease to match unlike when the print job of FIG. 8 is stored. In other words, if by media entry edit operation by the operator A, there is a subsequent job and the same media entry is stored as the usage media, a phenomenon in which the information of the media entry differs from when it was stored occurs. In other words, a situation occurs in which media that is incongruent with the intention of the operator B is associated with the print job of FIG. 8 as a result.

If the print job of FIG. 8 is executed as is, a resulting document that is not intended by the operator B will be generated. Hypothetically, assume that the operator B notices the editing of the media entry illustrated by reference numeral 702 in FIG. 9, and executes print processing after having changed the media entry to become what he desires. In such a case, the editing of the media entry is cumbersome. Also, a case in which it is envisioned that in this state the operator A once again inputs another job according to the same media settings at a later stage into the same digital printer 102. This time a side effect of the editing of the media entry by the operator B affects the operator A, and here too an inefficient state is fallen into.

<Improved Media Information>

Next, with reference to FIG. 10, explanation will be given for improving a portion of the media information of FIG. 7. The parameters from reference numerals 1006 to 1012 are the same as the parameters of reference numerals 706 to 712, and so explanation thereof is omitted. Here, a difference is that a field illustrated by reference numeral 1013 is added.

The field owner 1013 is a field for identifying a target person can use the media entry. So long as the operator that inputted the print job matches the target person recited in the owner 1013, it is searched as a media entry corresponding to an input job, and control is performed to set to the usage target media. In other words, even in the case where there is a media entry for which the attribute designation for the media of the print job hypothetically matches the grammage, the size, or the like, if the target person does not match, control is performed so that media entry is not selected as the usage target. Thus, by controlling so that media other than that of the target person cannot be used, it is possible to avoid a state in which there is contentious reference of a single media entry by a plurality of operators, and various problems that accompany editing as described above can be solved thereby.

Note, for a media entries for which the target person is shared, there is a special value arranged to purposely implement permission of usage by all operators. In a case where such media is associated as usage media, it is impossible to avoid a contentious reference state based on the information of the target person field, and the operation is the same as operation in a case where the media information in FIG. 7 is used. However, it is arranged because there are cases where it is convenient to make shareable media usable in operation.

<Improved Media Information Editing Example>

Next, with reference to FIG. 11, explanation will be given for a state of the media information immediately after inputting of the print job by the operator B illustrated in FIG. 8, when the media information managed by the media management unit 211 of the digital printer 102 according to the present embodiment is in a state illustrated in FIG. 10.

Reference numeral 1014 is a new media entry and attribute values are set for the media attributes of the media entry so that it is based on the media attributes included in the print setting illustrated by FIG. 8. That is, a corresponding media entry is searched upon the inputting of the print job of FIG. 8, but media that the operator B can use and that matches the media settings of the print job illustrated in FIG. 8 does not exist. So, it is registered as a new media entry and it is used as a usage target media entry.

Note, as described above, in the newly added media entries, for media attributes that are not designated in those of the print job that triggers the addition, fields other than the ID 1006, the name 1007, and the owner 1013 are supplemented by default values, and stored. It is expected that appropriate values will be further supplemented by the operator at a later stage. Hypothetically, a configuration may be employed in which default values from value ranges that each field attribute can take are set as the above described default values, and these values are stored upon an addition of a new media entry.

Furthermore, FIG. 12 illustrates an example of a result of performing the same edit operation as that performed by the operator A in FIG. 9 when the media information managed by the media management unit 211 of the digital printer 102 is in a state illustrated in FIG. 11. A result of performing the changing of the attributes of grammage and color by the operator A for the media entry illustrated by reference numeral 1002 is illustrated.

In a case of FIG. 12, the target person of the media entry illustrated by 1002 is the operator A. To put it differently, the operator B is not affected by this editing. This is because the media entry illustrated by reference numeral 1014 is added as a result of inputting of the job illustrated in FIG. 8 by the operator B, and it is selected as the usage target of the job.

Similarly, even if the operator B edits the content of the media entry illustrated by reference numeral 1014, the operator A is not affected by the editing. In this way, it becomes possible to resolve a failure upon applying editing to a media entry by avoiding a multiple reference of an media entry by a plurality of operators.

<Configuration of Print Job Data>

Figure 13:
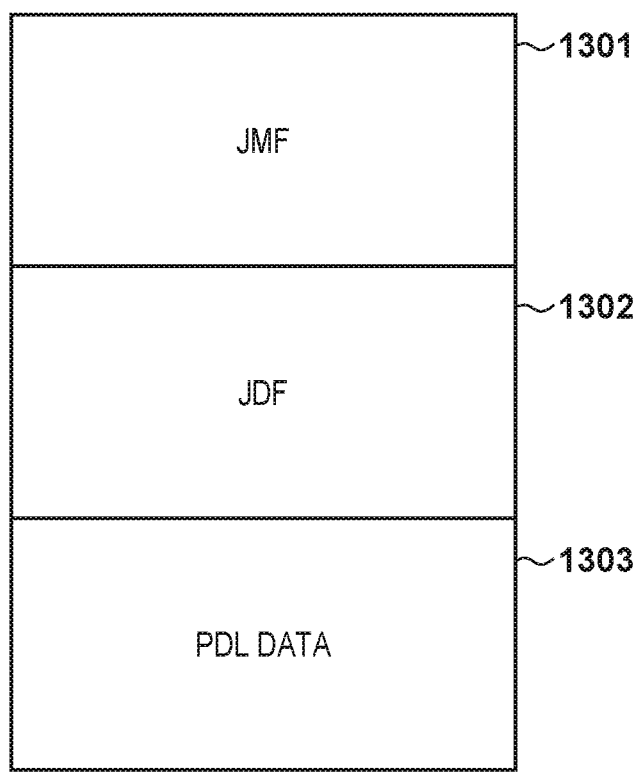
FIG. 13 is a view for illustrating a configuration of print job data that the digital printer 102 can receive according to a first embodiment.

Next, with reference to FIG. 13, explanation will be given for a configuration of data of print jobs executed by the JDF function program 404 which the digital printer 102 can process. The print job data in a JDF job is generally configured by 3 parts.

A JMF (Job Messaging Format) 1301 is a data region defining commands defined by a specification of JDF. In the present embodiment, behaviour upon the reception of a JDF job is defined by this data. More specifically, processing for switching whether to execute until processing for outputting the received print job data, or whether to store the received print job data in the digital printer 102 so that the job hold function program 411 can be used after extraction processing, is designated. Further, various settings relating to an execution of a JDF job can be defined by the JMF 1301, but details thereof are omitted.

A JDF (Job Definition Format) 1302 is a data region for storing print setting information such as is illustrated in FIG. 6 and FIG. 8. As described in the explanation of FIG. 6 and FIG. 8, information relating to media settings used for a print job is also included in this data. PDL data 1303 is a region for image data which becomes the printing target of a print job.

In a JDF job, it is common to integrate the above described 3 data regions and transmit to the digital printer 102 as data in single state. However, it is also possible to designate in JDF with a job inputting method according to another embodiment, but details thereof are omitted because they are not important in the explanation of the effect of the present invention.

<Processing Procedure>

Figure 14:
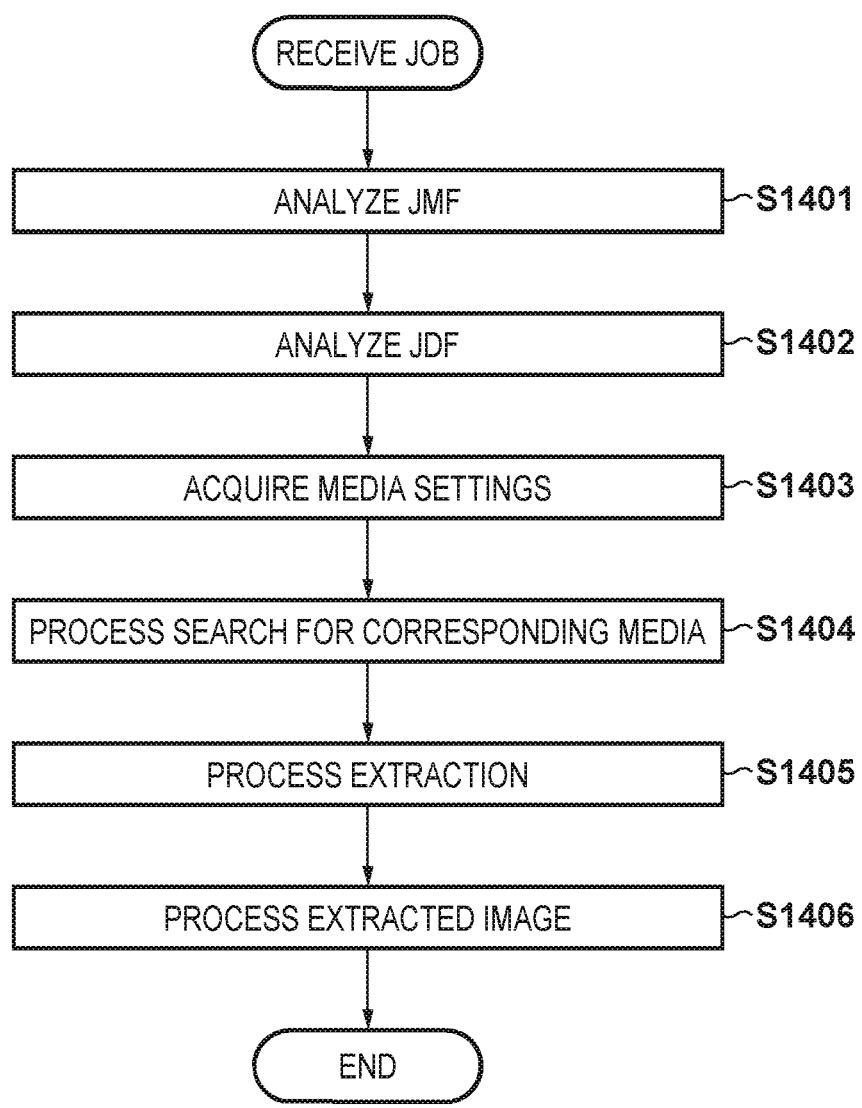
FIG. 14 is a flow diagram for explaining operation of a print job received and executed in the digital printer 102 according to a first embodiment.

Next, explanation will be given for a processing procedure of the JDF function program 404 executed by the controller unit 205 with reference to FIG. 14. The processing of the JDF function program is started triggered by job data illustrated in FIG. 13 being received by the digital printer 102 via the external I/F 202. Also, processing explained below is realized by the controller unit 205 reading out the JDF function program 404 stored in the ROM 207 or the HDD 209 to the RAM 208, and executing it.

In step S1401, the controller unit 205 executes processing for analyzing the JMF. This corresponds to processing for analyzing the data described in the JMF 1301 of FIG. 13. Below, explanation will be given for a case where the JMF 1301 includes a setting that executes not printing but storing.

In step S1402, the controller unit 205 executes processing for analyzing the JDF. This corresponds to processing for analyzing the data described in the JDF 1302 of FIG. 13. A media setting by an attribute designation is also included. Then, in step S1403, the controller unit 205 extracts settings relating to the media from a print job setting analyzed in step S1402. More specifically, the result of analyzing the media settings described in portions corresponding to 601 and 801 in FIG. 6 or FIG. 8 is acquired.

In step S1404, the controller unit 205 searches for a media entry matching with the media settings acquired in step S1403 in the media information held in the digital printer 102 managed by the media management unit 211. The processing in this step corresponds to processing for searching for a media entry that can be used for the inputted job from out of the media information illustrated in FIG. 10 using the media attribute information designated by the JDF. Alternatively, in a case where the corresponding entry does not exist, as described in the explanation of FIG. 11, processing for adding the corresponding entry is also included in the content of the execution in this step. Details of the processing in step S1404 is explained later.

In step S1405, the controller unit 205 extracts the PDL data 1303 based on the print setting extracted in step S1403 to generate image information. More specifically, the image information expressed by the PDL language is converted into internal data such as a bitmap for which print processing can be performed. Then, in step S1406, the controller unit 205 processes the post-extraction image data generated in step S1405. The print processing or storing of the post-extraction image data is the processing content.

Next, with reference to FIG. 15, explanation will be given for processing of step S1404 in FIG. 14, i.e. a detailed procedure of processing for searching for a media entry to set as a usage target for the job. Also, processing explained below is realized by the controller unit 205 reading out the JDF function program 404 stored in the ROM 207 or the HDD 209 to the RAM 208, and executing it. Also, in the process the JDF function program 404 makes a request to the media management program 410 for execution of a portion of the processing based on control by the controller unit 205.

In step S1501, the controller unit 205 acquires a list of attributes of media which is a check target in advance. This is the information corresponding the information extracted in step S1403 of FIG. 14. Next, in step S1502, the controller unit 205 extracts search target media entries. More specifically, refinement to media that is valid for an owner of the media who is the target of the investigation in the media information illustrated in FIG. 11 is performed. In other words, processing for extracting only a list of media entries in which the information of the owner 1013 column in FIG. 11 is the operator who is the job executor and media entries in which the information of the owner 1013 column is "common" is executed in this step. With this, processing is performed to limit the user for whatever media entries, for which media that is designated by the media settings of the print job can be used on the digital printer 102, are associated as targets. This is processing intended to avoid a contentious reference state of single media entry as explained in FIG. 9.

In step S1503, the controller unit 205 determines whether or not inspection has completed for all entries of the media information extracted in step S1502. This is for forming loop processing for executing all matching of media entries extracted in step S1502 and the media in step S1501. If inspection has completed, the processing proceeds to step S1512, and when that is not the case, the processing proceeds to step S1504.

In step S1504, the controller unit 205 sets a result-stored-flag for determining the processing result to an initial value. At a final determination of this processing, in a case where the value of this flag is true, it is indicated that media that matches the media according to the attribute designation included in the print job exists in the media information extracted in step S1502. When that is not the case the value of the flag is false.

Next, in step S1505, the controller unit 205 selects a media entry to be a target of matching from out of media entries extracted in step S1502. The selection is performed in accordance with the information acquired in step S1403. More specifically, the attribute information set in 601 or 801 will be selected. In step S1506, the controller unit 205 selects one attribute from the inspection target attributes from the media entry selected in step S1505. More specifically, this is one of the attributes selected in step S1505 from fields such as the grammage 1008, the surface property 1009, the shape 1010, the color 1011, and the size 1012 illustrated in FIG. 10.

In step S1507, the controller unit 205 determines whether or not the matching processing has been performed for all of the inspection target attributes. If it has be performed, the processing proceeds to step S1513, and when that is not the case, the processing proceeds to step S1508. In step S1508, the controller unit 205 compares the attribute in the media entry extracted in step S1506 with the attributes acquired in step S1501, and determines the result in step S1509. In a case where the determination result in step S1509 indicates a match, the processing returns to step S1506, and in a case where there is no match the processing proceeds to step S1510.

In step S1510, the controller unit 205 determines whether or not the attribute value of the media entry is ANY or Default. These ANY or Default are not explicit values. To put it differently, any attribute value matches with these values. Accordingly, if it is ANY or Default, it is treated to be equivalent to something that does match in the determination of step S1509, the processing returns to step S1506 and the loop processing is continued.

On the other hand, in a case where the results in step S1510 is false, it means that the attribute value which does not match is detected as the result of matching. Accordingly, in step S1511 the controller unit 205 treats the comparison target media as a mismatch, sets a false value to the flag storing the result of the comparison, and returns processing to step S1506.

Also, in a case where the determination result of step S1507 is true, the processing proceeds to step S1513, the controller unit 205 determines the value of the flag. That is, in a case where the value of the flag is true, it is determined that the inspection target media of the loop processing performed up until the immediately previous step and the attribute values match. In such a case, it is determined that this media is media that is associated with the media designated by the print job, and the flow in this figure is terminated.

Meanwhile, in a case where the result of the determination of step S1513 is false, it is determined that the inspection target media of the loop processing performed up until the immediately previous step and the attribute values do not match. In such a case, the processing returns to step S1503 and the processing transitions to the next comparison target media. Similarly, the loop processing is executed until the media treated as matching is found.

Also, in a case where the determination result in step S1503 is true, it corresponds to a situation where the result of searching all media entries for what matches with the media attributes of the print job is that there is no match. In such a case, the processing proceeds to step S1512, the controller unit 205 refers the attributes of the print job, generates a new media entry, and the processing is terminated. This corresponds to the processing for adding a media entry illustrated by reference numeral 1014 explained in FIG. 12.

Note, this is an example of the case where one type of media is used in the print jobs in the examples illustrated in FIG. 6 and FIG. 8. As a matter of course, a plurality of media may be used in one print job. In that case, a repetitive process is performed for the number of the media types in the above described flowchart.

Figure 15:
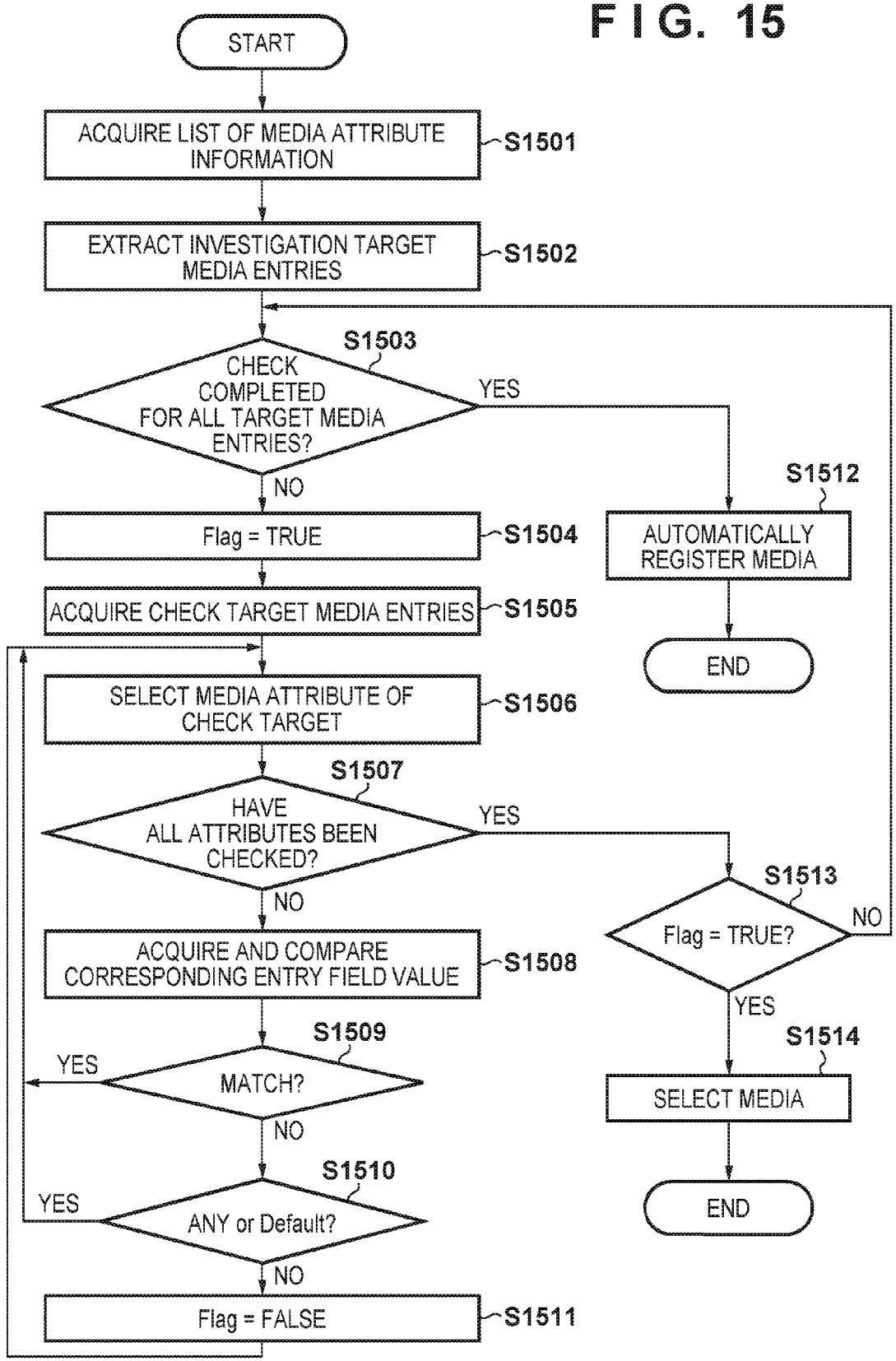
FIG. 15 is a view for explaining a flow of processing for determining media to be applied for a received print job in the digital printer 102 according to a first embodiment.
Figure 16:
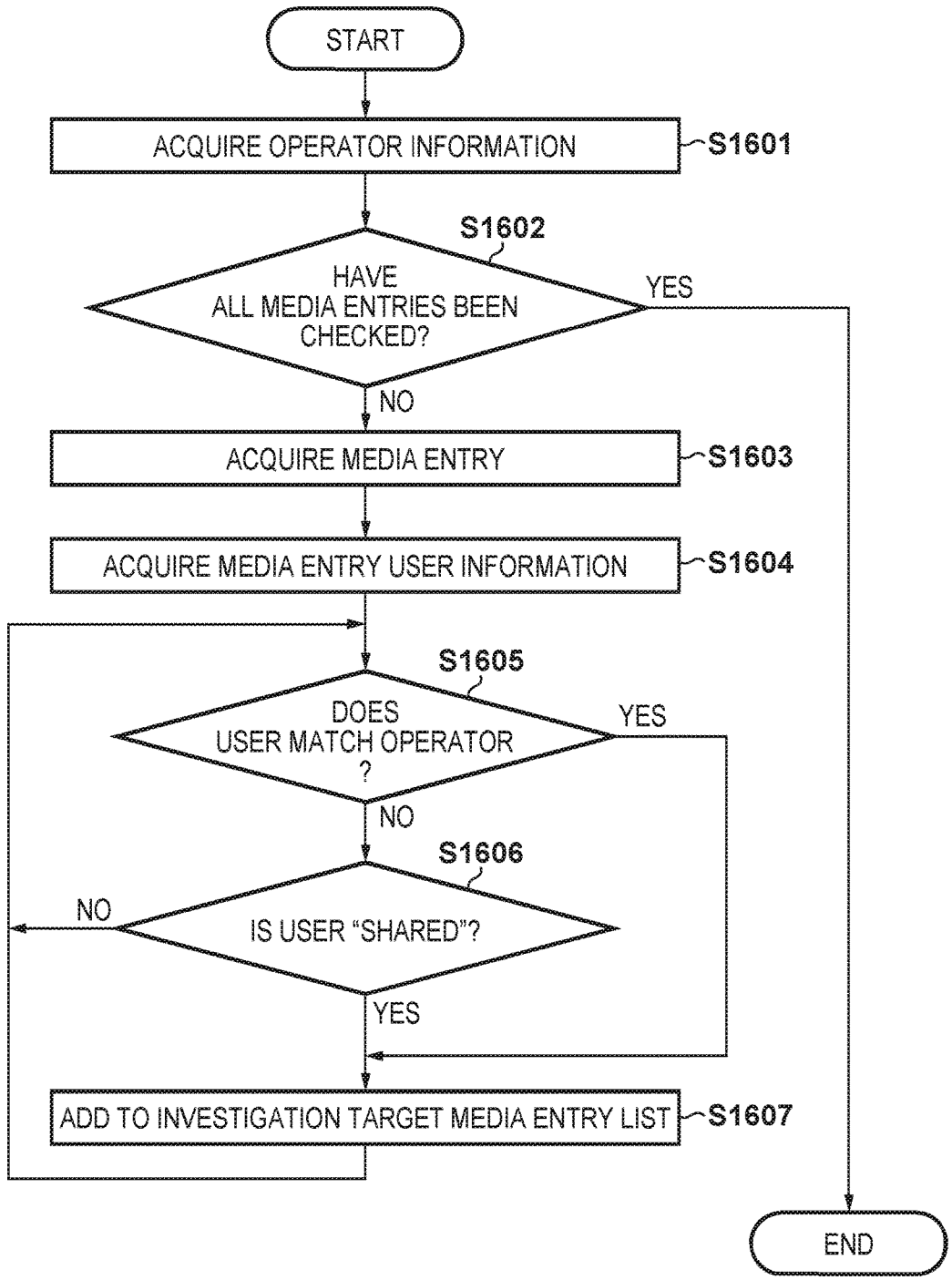
FIG. 16 is a flow diagram for explaining details of step S1414 from a print job operation illustrated in FIG. 14.

FIG. 16 is illustrates a detailed procedure for extracting the investigation target media entries in step S1502 of FIG. 15. The processing explained below is realized by the controller unit 205 reading the JDF function program 404 stored in the ROM 207 or the HDD 209 into the RAM 208, and executing it.

In step S1601, the controller unit 205 acquires information of an operator who is the executor (operator) of the print job. The information may be acquired from the print setting information illustrated in FIG. 6 or FIG. 8, and may be based on the login information for being granted authority to execute the digital printer 102.

After step S1602, the loop processing is formed for executing a desired inspection for all entries of the media information illustrated in FIG. 10. In step S1602, the controller unit 205 determines whether or not inspection has been performed for all media entries, and if inspection has been performed, the loop processing is terminated. On the other hand, the processing proceeds to step S1603 if it has not ended.

In step S1603, the controller unit 205 selects the media entry that is the inspection target. This corresponds to the processing for successively selecting each media entry illustrated in FIG. 10. In step S1604, the controller unit 205 extracts the information relating to the target person for the media entry selected in step S1603. This corresponds to processing for extracting the owner information of the owner 1013.

In step S1605 and in step S1606, the controller unit 205 compares the operator information and the user information acquired in step S1604 and in step S1601. That is, it is determined whether or not the operator information matches with the user information of the owner 1013 of the media entry, or whether the user information is "shared". In other words, it is determined whether or not the operator satisfies the condition as to whether the media can be used upon execution of the print job based on the operator information.

In a case where either step S1605 or step S1606 are true, the processing proceeds to step S1607, the controller unit 205 stores the media entry as an item in the investigation target media list. On the other hand, in a case where both step S1605 and step S1606 are false, the controller unit 205 skips the media entry and returns the processing to step S1602 so that the same determination processing is applied to the next media entry.

Figure 17:
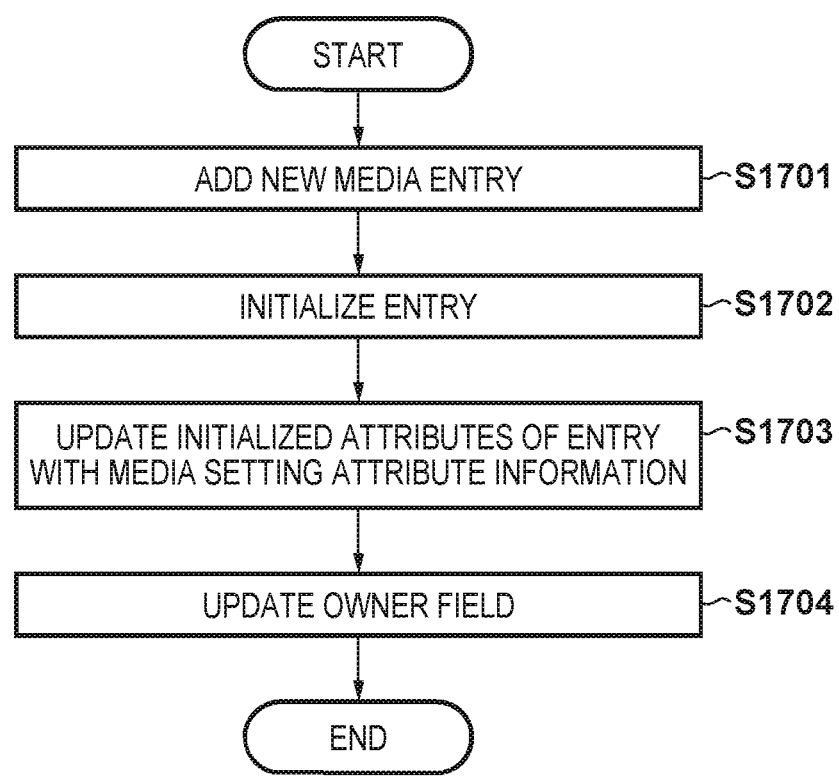
FIG. 17 is a flow diagram for explaining details of step S1512 from a print job operation illustrated in FIG. 15.

FIG. 17 is illustrates a detailed procedure for automatic registration processing of a media entry in step S1512 of FIG. 15. The processing described below is realized by the controller unit 205 reading the JDF function program 404 stored in the ROM 207 or the HDD 209 into the RAM 208 and executing it.

In step S1701, the controller unit 205 adds a new entry to management area of the media information illustrated in FIG. 10. In this state, an entry is just added and each field information value in the entry is not set. However, an unique ID corresponding to the added entry is assigned to the ID 1006. The ID is controlled so that the uniqueness is always guaranteed by the media management unit 211. In step S1702, the controller unit 205 initializes the media entry added in step S1701 using initial values, that is default values. Here, the values in fields of 1007 through 1013 are updated by the initial values. The value used for each field as the initial value is controlled by the media management unit 211, but configuration may be taken in which it is controllable so that the initial value is variable.

In step S1703, in a state in which the initialization has been performed in step S1702, the controller unit 205 updates the value of each field of the media entry with the values acquired in step S1501, that is the media setting information in the print job. With this, the media setting information of the print job can be reflected to the media entry added in step S1701. In step S1704, the controller unit 205 updates the value of the owner information of the owner 1013 in accordance with the operator of the print job which is the trigger of the addition of the media entry, i.e. the operator information.

As explained above, for each of a plurality of types of storage mediums to be the printing target, the printing apparatus according to the present embodiment stores media information associated with these storage medium which includes information of a target person who is permitted to use the storage medium. Furthermore, when a print job is accepted, the printing apparatus analyzes the attribute information relating to a sheet used in the print job, compares the analysis result with the media information already stored, and searches for corresponding media information which the operator instructing the print job can use. Here, if the corresponding media information is not found, the printing apparatus newly adds the media information of the storage medium used for the accepted print job. In this way, according to the present embodiment, even in a case where a multiple reference from a plurality of operators is performed on media information, if a portion of the attribute information included in the media information is different, the media information is added newly without editing that portion and using. Accordingly, it is possible to avoid a resulting document that is not desired by another operator being obtained.

<Second Embodiment>

Below, explanation will be given a second embodiment of the present invention using FIG. 18 through FIG. 21. In the above described first embodiment, explanation was given for an example in which, by using information of the owner 1013, a problem of a multiple reference of a media entry by a plurality of operators is avoided. In the present embodiment, explanation is given for a method of resolving the same problem by arranging information indicating whether or not a referenced state is entered in place of using owner information in media entries.

<Media Information>

First, explanation will be given with reference to FIG. 18 of an example of media information that the media management unit 211 of the digital printer 102 in the present embodiment manages. Explanation is given comparing against FIG. 10 shown in the above described first embodiment.

A field denoted by reference numeral 1813 is a point that differs from the media information in the first embodiment described above. In other words, in the present embodiment, a media entry comprises a field of a referenced state 1813 which holds information as to whether or not a media entry is in a state in which the media entry is referenced by a print job. It is possible to aim to resolve the problem by controlling using information of the referenced state 1813. The referenced state is information indicating whether or not a predetermined user is referencing the entry. For example, if in the referenced state, it is controlled such that another user cannot reference the entry. With this, it is possible to avoid a multiple reference.

FIG. 19 illustrates an example in which in a case where the media information in the present embodiment is in the state illustrated in FIG. 18, after inputting a print job having the print settings illustrated in FIG. 6, the media information is edited. As is illustrated in FIG. 19, the referenced state of an entry 1802, which is a media entry for which the media settings included in the print job, i.e. the size 602 and the grammage 603 of the media match, is updated.

FIG. 20 illustrates an example in which in a case where the media information in the present embodiment is in the state illustrated in FIG. 19, after inputting a print job having the print settings illustrated in FIG. 8, media information is edited. As illustrated in FIG. 20, it can be seen that a media entry illustrated by an entry 1814 is added from the state illustrated in FIG. 19. Here, media including suitable conditions at the time of inputting this print job is a media entry denoted by reference numeral 1802. However, because this media entry is in the referenced state, a new media entry is added to avoid a multiple reference, and the result is that control is performed so that this media enters the referenced state. As is described above, a multiple reference state can be avoided by adding information identifying the referenced state to media entries.

<Processing Procedure>

Figure 21:
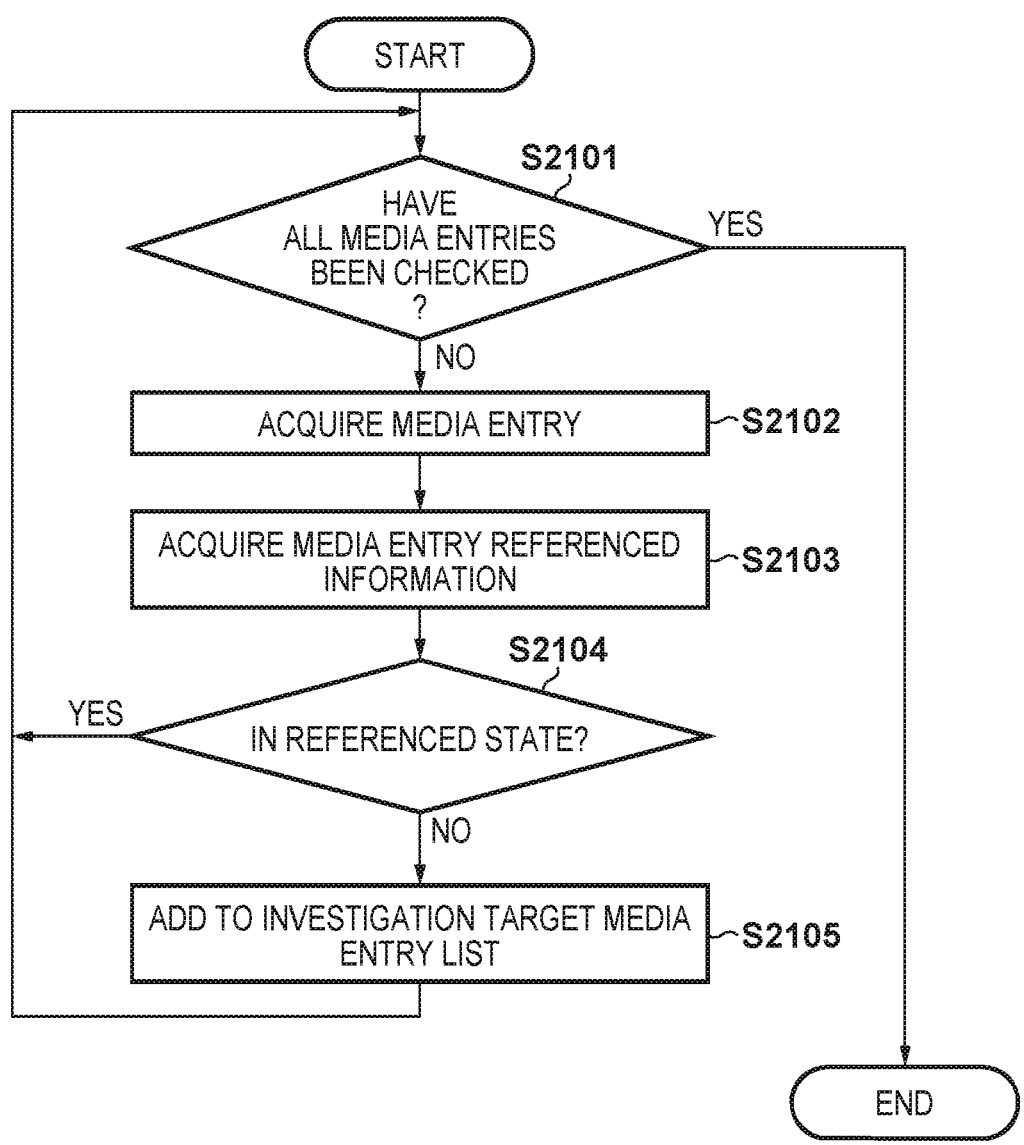
FIG. 21 is the view for explaining a flow of processing for inspecting search target media according to a second embodiment.

Next, with reference to FIG. 21, explanation will be given for a processing procedure for extracting a search target media entry in the present embodiment. The processing explained below is realized by the controller unit 205 reading the JDF function program 404 stored in the ROM 207 or the HDD 209 into the RAM 208, and executing it. Also, in the process the JDF function program 404 makes a request to the media management program 410 for execution of a portion of the processing based on control by the controller unit 205. Also, the flowchart illustrated in FIG. 21 corresponds to the flowchart of FIG. 16 of the foregoing first embodiment, and is something that illustrates detailed processing of step S1502 in the present embodiment.

From step S2101, loop processing for executing a desired inspection for all entries of the media information illustrated in FIG. 18 is formed. In step S2101, the controller unit 205 determines whether or not inspecting is performed for all media entries, and if inspecting is performed the loop processing is terminated. On the other hand, the processing proceeds to step S2102 if it has not ended. In step S2102, the controller unit 205 selects a media entry to be the inspection target. This corresponds to the processing for successively selecting each media entry illustrated in FIG. 18.

In step S2103, the controller unit 205 extracts the referenced information for the media entry selected in step S2102. This corresponds to processing for extracting information defined in the referenced state 1813. Continuing on, in step S2104, the controller unit 205, based on the information acquired in step S2103, determines whether or not entry is in the referenced state. If the determination result is false, the processing proceeds to step S2105, the controller unit 205 stores the media entry in an investigation target media list, and the processing returns to step S2101. Meanwhile, if the determination result is true, the media entry is skipped, and the controller unit 205 returns the processing to step S2101 in order to apply the same determination processing to the next media entry.

As explained above, for a plurality of types of a storage mediums that become printing targets, the printing apparatus according to the present embodiment stores media information associated with the storage medium including referenced information indicating whether or not the media information is referenced. Furthermore, when a print job is accepted, the printing apparatus analyzes the attribute information relating to a sheet used in the print job, compares the analysis result with the already stored media information, and searches for corresponding media information which the operator that instructs the print job can use. Here, if the corresponding media information is not found, the printing apparatus newly adds the media information of the storage medium used for the accepted print job. In this way, according to the present embodiment, even in a case where a multiple reference from a plurality of operators is performed on the media information, if a portion of the attribute information included in the media information is different, the media information is added newly without editing and using that portion. Accordingly, it is possible to avoid a resulting document that is not desired by another operator being obtained.

<Third Embodiment>

Below, explanation will be given a third embodiment of the present invention with reference to FIG. 22 through FIG. 25. In the foregoing second embodiment, an example is illustrated in which by having information of the referenced state 1813 as illustrated in FIG. 18, a problem accompanying a multiple reference of a media entry is avoided. Also, an example is illustrated in which in the foregoing second embodiment, if a multiple reference is detected by information of the referenced state 1813, a multiple reference state is avoided by generating a new media entry. Meanwhile, in the present embodiment an example is illustrated in which, similarly to in the foregoing second embodiment, information regarding a referenced state is held in the media entries, but if it is determined that there is the possibility that a multiple reference will occur, a multiple reference state is avoided by executing other processing. In other words, when execution of an edit operation for a media entry in a multiple reference state is attempted, control is performed to prompt the operator of the digital printer 102 to perform avoidance processing by warning the operator that it is in the multiple reference state. Note that this other processing may also be applied to the foregoing first embodiment.

<Media Information>

Firstly, with reference to FIG. 22, explanation will be given media information in the present embodiment. This corresponds to the information of FIG. 18 in the foregoing second embodiment. In the reference count 1813, a reference count for each media entry is stored. With this, it can be distinguished whether it is in a non-referenced state, a single reference state, or multiple reference state. Other fields are similar to FIG. 18 and so explanation is omitted.

<Screen Examples>

Figure 23:
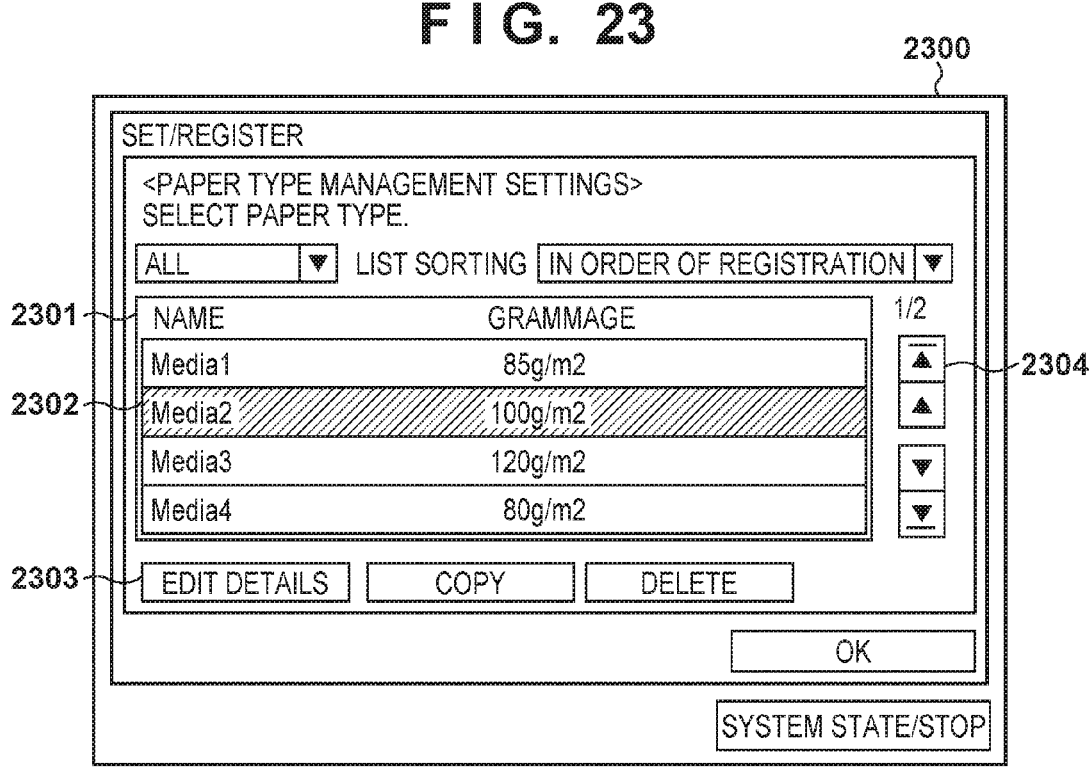
FIG. 23 is an example of a media information edit operation screen displayed on an operation unit 204 of the digital printer 102 according to a third embodiment.

Next, with reference to FIG. 23, explanation will be given for an example of an operation screen for editing media information displayed on the operation unit 204 of the digital printer 102. On an operation screen 2300, a list of media registered in the digital printer 102 is displayed. This list is displayed based on media information illustrated in FIG. 22. In other words, information related to a plurality of media is displayed in a media list 2301. It is indicated that of these the media denoted by reference numeral 2302 is in a selected state. The media 2302 corresponds to media of the entry 1802 of FIG. 22.

Similarly to in the foregoing second embodiment, explanation is given for an example of a case in which immediately after inputting the save-type print job illustrated in FIG. 6, the save-type print job illustrated in FIG. 8 is similarly input. For the state of the media information here, the case of the state illustrated in FIG. 22 is envisioned. In other words, the state is such that the media corresponding to the entry 1802 is referenced by 2 different jobs.

An edit details button 2303 arranged on the operation screen 2300 is a button for transitioning to a screen for changing attributes of the media selected in the media list 2301. In the state of the screen illustrated in FIG. 23, if the edit details button 2303 is operated, transition is made to an attribute editing screen for the media of the entry 1802. However, because there is a multiple reference of the media of the entry 1802, if editing of an attribute to be adapted to one job is permitted, there is the possibility that it will become content that is not convenient for another job. Reference numeral 2304 denotes a screen configuration element which is a scroll button for causing information of media that cannot be fully displayed on the media list 2301 to scroll and be displayed.

Figure 24:
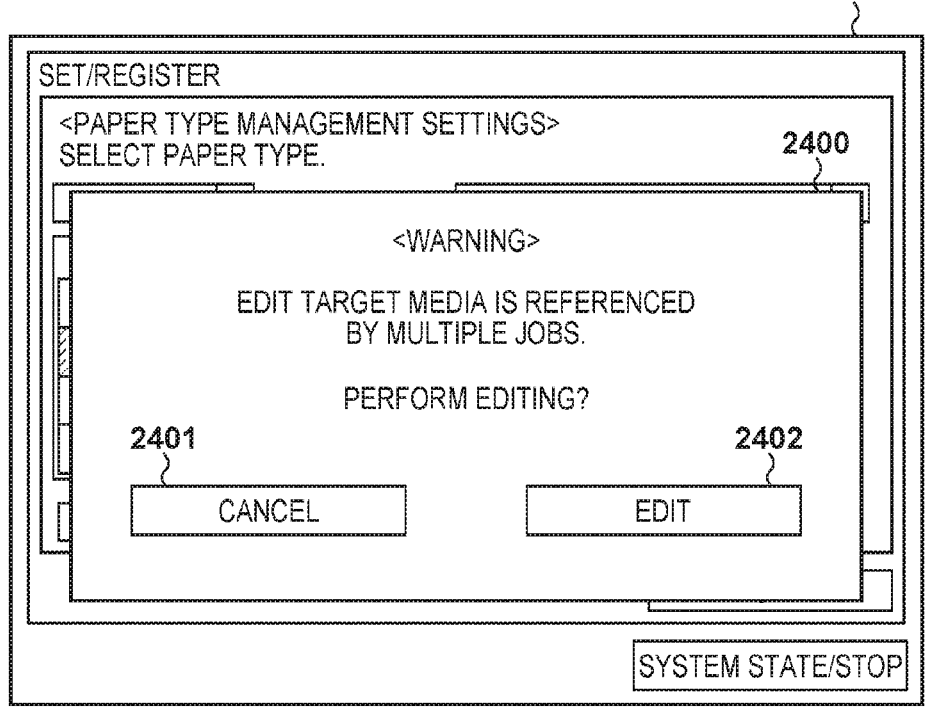
FIG. 24 is a view for illustrating an example of a result of operating an editing screen illustrated in FIG. 23.

FIG. 24 illustrates an example of a screen displayed immediately after the edit details button 2303 in the operation screen 2300 is operated. In order to suppress the occurrence of a failure accompanying media in a state in which it is referenced by a plurality of jobs being edited, if an instruction for editing media in a multiple reference state is detected, a warning screen 2400 is displayed with the object of arousing the operator's attention. In other words, simultaneously to displaying the warning message, when a cancel button 2401 for cancelling editing is operated, the operation screen 2300 is returned to. Also, configuration is taken such that it is possible to execute editing forcibly by operating an edit button 2402 if it is chosen that editing be performed having recognized that it is in a contentious reference state.

<Processing Procedure>

Figure 25:
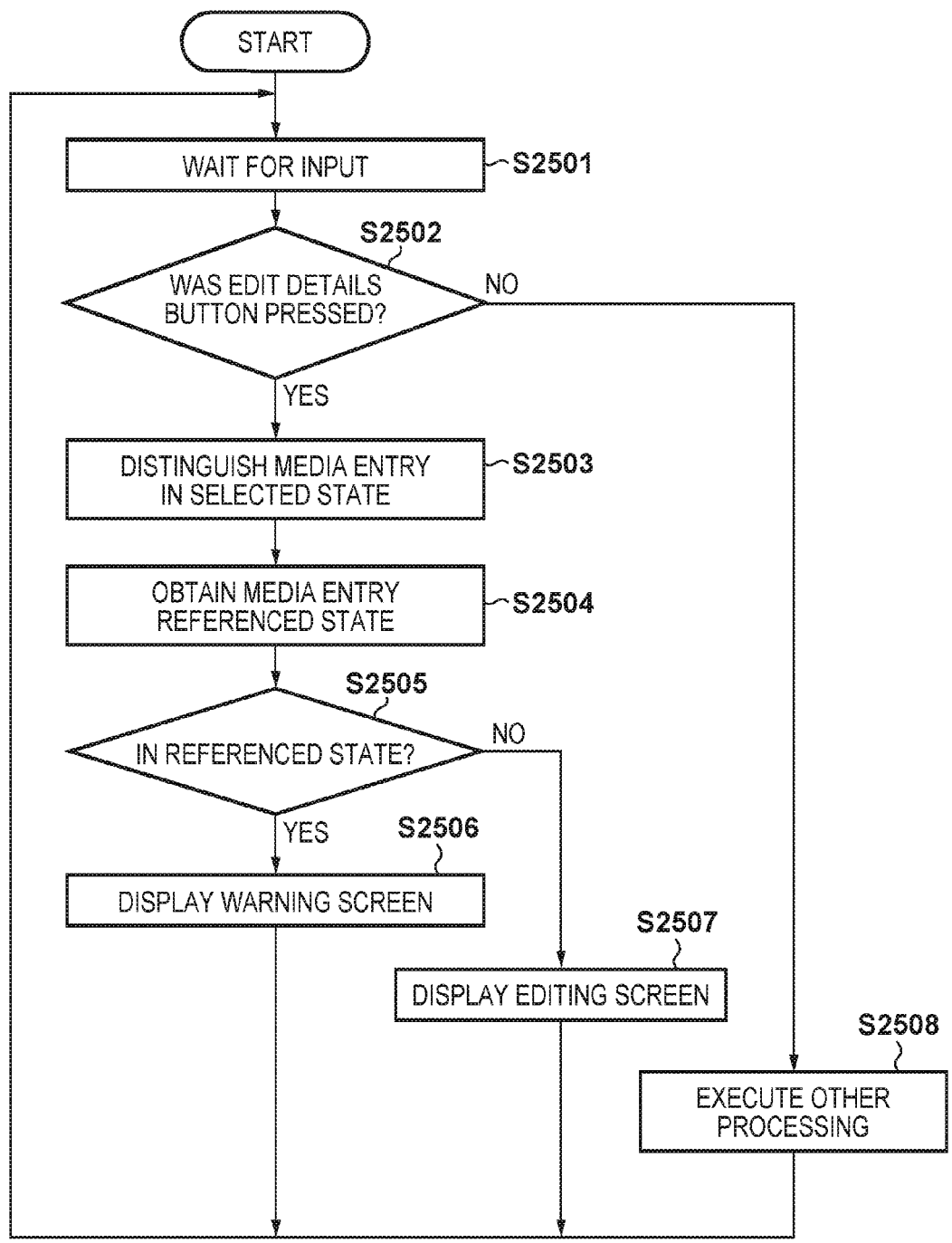
FIG. 25 is a view for explaining an operation of a screen display displayed on the operation unit 204 according to a third embodiment.

Next, with reference to FIG. 25, explanation will be given for a processing procedure for operation of editing processing in the media editing screens illustrated FIG. 23 and FIG. 24 in the present embodiment. The processing explained below is realized by the controller unit 205 reading the media management program 410 and the UI function program 409 stored in the ROM 207 or the HDD 209 into the RAM 208 and executing them.

In step S2501, the controller unit 205 enters a state for waiting for input from the operator. This corresponds to a state of waiting to accept a selection operation by the operator in relation to any of the screen elements illustrated in FIG. 23 and FIG. 24. Triggered by one of the screen configuration elements illustrated in FIG. 23 and FIG. 24 being operated by the operator, the processing proceeds to step S2502.

In step S2502, the controller unit 205 determines whether or not the operation input by the operator which is selected in step S2501 is an operation on the edit details button 2303. If so, the processing proceeds to step S2503, and when that is not the case, the processing proceeds to step S2508. In step S2503, the controller unit 205 determines the media entry which was in the selected state at the point in time at which the operation of the edit details button 2303 was performed, and acquires the referenced state of this media entry in step S2504. This corresponds to the processing for acquiring information of the referenced state 1813 for the investigation target media in the media information illustrated in FIG. 18.

In step S2505, the controller unit 205 determines referenced information acquired in step S2504. More specifically, it is determined whether or not the media that is the inspection target in processing up to this step is in a referenced state. If the result of the determination of this step is true, i.e. if the reference count 1813 indicates a value of 1 or more, the warning screen 2400 illustrated in FIG. 24 is displayed. Meanwhile, if the result of the determination is false, i.e. if the value of the reference count 2213 indicates 0, the processing proceeds to step S2507, and the controller unit 205 transitions to the media attribute editing screen without displaying the warning screen 2400.

Also, if the determination result of step S2502 is false, the operation selected in step S2501 indicates an operation other than one on the edit details button 2303. In such a case, the processing proceeds to step S2508, and the controller unit 205 executes corresponding processing, but detailed explanation is omitted.

As explained above, in the printing apparatus in the present embodiment, media information is configured so as to include a reference count in place of the referenced information in the foregoing second embodiment. Here, if the reference count indicates 0, it is determined that it there is no reference, and if the reference count indicates 1 or more, it is determined that there is a reference. Also, if it is determined that there is a reference, i.e. if there is the possibility of a multiple reference, a warning screen prompting a warning of the operator is displayed to the operation unit. Accordingly, in in the present embodiment, similarly to in the foregoing second embodiment, it is possible to avoid another operator obtaining a resulting document that he does not desire.

The present invention is not limited to the above described embodiments, and various variation based on the gist of the present invention (including organic combinations of each of the embodiments) are possible, and these are not excluded from the scope of the invention. For example, in the present embodiment, the controller unit 205 of the digital printer 102 is the subject of each type of control, but configuration may be taken such that all or part of the various control can be executed by an externally-attached controller of a housing separate to that of the digital printer 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-257829 filed on Dec. 19, 2014, which is hereby incorporated by reference herein in its entirety.

What is claimed is:

1. A printing apparatus comprising:
 a storage configured to store sheet information and user identification information in association with each other, wherein the storage stores the sheet information including attribute information; and
 a processor that executes a set of instructions to cause the printing apparatus to function as:
 a receiving unit configured to receive a print job including attribute information of a sheet and user identification information;
 a selecting unit configured to select, from the storage, sheet information based on the attribute information and the user identification information, which are included in the print job received by the receiving unit; and
 a register unit configured to register, with the storage, sheet information generated from the attribute information included in the received print job in association with the user identification information included in the received print job, in a case in which the sheet information including the attribute information included in the received print job is not stored in the storage in association with the user identification information included in the received print job.

2. The printing apparatus according to claim 1, wherein the processor executes the instructions to cause the printing apparatus to further function as a comparing unit configured to compare the user identification information associated with sheet information with the user identification information included in the received print job, and
 wherein the selecting unit selects sheet information that is associated with the user identification information included in the received print job, from the storage, based on a comparison result by the comparing unit.

3. The printing apparatus according to claim 1, further comprising a printing unit configured to perform printing using the sheet information selected by the selecting unit.

4. The printing apparatus according to claim 1, wherein the sheet information includes at least one of a sheet size, a sheet grammage, a sheet surface property, a sheet shape, and a sheet color.

5. The printing apparatus according to claim 1, wherein the selecting unit selects the sheet information registered by the register unit.

6. The printing apparatus according to claim 1, wherein the processor executes the instructions to cause the printing apparatus to further function as an accepting unit configured to accept, from a user, an edit of the sheet information selected by the selecting unit.

7. The printing apparatus according to claim 1, wherein the selecting unit selects sheet information to be used for the received print job using the attribute information included in the received print job, from sheet information that the user associated with the user identification information included in the received print job can use.

8. The printing apparatus according to claim 7, wherein the sheet information that the user, associated with the user identification information included in the received print job, can use is sheet information stored in the database in association with the user identification information, or sheet information to be shared and used by any user.

9. The printing apparatus according to claim 1, wherein the register unit generates sheet information setting a value of the attribution information that is not included the received job as a default value.

10. The printing apparatus according to claim 1, wherein the processor executes the instructions to cause the printing apparatus to further function as a holding unit configured to hold the received print job without printing until receiving a user instruction for printing based on the received print job.

11. The printing apparatus according to claim 10, wherein the holding unit holds the received print job associated with the sheet information selected by the selecting unit.

12. The printing apparatus according to claim 1, wherein the selecting unit selects, from the storage, the sheet information including the same attribution information included in the received print job.

13. The printing apparatus according to claim 1, wherein the selecting unit selects, from the storage, the sheet information associated with the same user identification information included in the received print job.

14. The printing apparatus according to claim 1, wherein the register unit registers sheet information including the attribution information included in the received print job without a user instruction for registering new sheet information.

15. A control method in a printing apparatus that includes a storage configured to store sheet information associated with user identification information, wherein the storage stores the sheet information including attribute information, the control method comprising:
 receiving a print job including attribute information of a sheet and user identification information associated with a user;
 selecting, from the storage, sheet information based on the attribute information and the user identification information, which are included in the received print job; and
 registering, with the storage, sheet information generated from the attribute information included in the received print job in association with user identification information included in the received print job, in a case in which the sheet information including the attribute information included in the received print job is not stored in the storage in association with the user identification information included in the received print job.

16. A non-transitory computer readable storage medium for storing a computer program for controlling a printing apparatus that includes a database configured to store sheet information associated with user identification information, wherein the database stores sheet information including attribute information, the program comprising:
- a code to receive a print job including attribute information of a sheet and user identification information associated with a user;
- a code to select, from the database user identification information of a user and sheet information including attribute information in association with each other, the sheet information being based on the attribute information and the user identification information, which are included in the received print job; and
- a code to register, with the database, sheet information generated from the attribute information included in the received print job, in association with user identification information included in the received print job, in a case when sheet information including the attribute information included in the received print job is not stored in the storage in association with the user identification information included in the received print job.

* * * * *